(12) United States Patent
Ray et al.

(10) Patent No.: US 11,875,541 B2
(45) Date of Patent: Jan. 16, 2024

(54) PREDICTIVE GEOMETRY CODING IN G-PCC

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 102 days.

(21) Appl. No.: 17/449,003

(22) Filed: Sep. 27, 2021

(65) Prior Publication Data

US 2022/0108484 A1  Apr. 7, 2022

Related U.S. Application Data

(60) Provisional application No. 63/114,317, filed on Nov. 16, 2020, provisional application No. 63/088,831, filed on Oct. 7, 2020.

(51) Int. Cl.
*G06T 9/00* (2006.01)
*G06T 9/40* (2006.01)
(Continued)

(52) U.S. Cl.
CPC .......... *G06T 9/001* (2013.01); *G01S 7/4808* (2013.01); *G01S 13/42* (2013.01); *G06T 9/40* (2013.01); *G01S 7/4802* (2013.01)

(58) Field of Classification Search
None
See application file for complete search history.

(56) References Cited

U.S. PATENT DOCUMENTS 11,580,672 B2 * 2/2023 Van der Auwera .... H04N 19/91
2021/0201539 A1 * 7/2021 Wang .................. H04N 19/184
(Continued)

FOREIGN PATENT DOCUMENTS

EP          4072145 A1   10/2022
WO    WO-2022166957 A1   8/2022

OTHER PUBLICATIONS

Flynn, D., (Apple) et al., "CE13.39 Review of Predictive Geometry Residual Magnitude Coding", 131, MPEG Meeting, Jun. 29, 2020-Jul. 3, 2020, Online, (Motion Picture Expert Group or ISO/IEC JTC1/SC29/WG11), No. m54674 Jun. 24, 2020 (Jun. 24, 2020), XP030289243, pp. 1-5, Retrieved from the Internet: URL: http://phenix.int-evry. fr/mpeg/doc_end_user/documents/131_OnLine/wg11/m54674-v1-m54674_v1.zip m54674.pdf [retrieved on Jun. 24, 2020].
(Continued)

Primary Examiner — Anand P Bhatnagar
(74) Attorney, Agent, or Firm — Shumaker & Sieffert, P.A.

(57) ABSTRACT

An example method of encoding a point cloud includes obtaining a value of a secondary residual for geometry coding a current predictive tree node of the point cloud; and encoding the value of the secondary residual, wherein encoding the value comprises: encoding, using a first set of context-adaptive binary arithmetic coding (CABAC) contexts, prefix bins of a syntax element having a value that specifies an absolute value of the value of the secondary residual minus 2; and encoding, using a second set of CABAC contexts that is different than the first set of contexts, suffix bins of the syntax element.

46 Claims, 15 Drawing Sheets

(51) Int. Cl.
*G01S 7/48* (2006.01)
*G01S 13/42* (2006.01)

(56) References Cited

U.S. PATENT DOCUMENTS

| | | | | |
|---|---|---|---|---|
| 2021/0203989 | A1* | 7/2021 | Wang | H04N 19/70 |
| 2022/0108485 | A1* | 4/2022 | Ramasubramonian | G01S 7/4802 |
| 2022/0108491 | A1* | 4/2022 | Ray | G01S 17/931 |
| 2022/0124359 | A1* | 4/2022 | Wang | H04N 21/23614 |
| 2022/0343547 | A1* | 10/2022 | Moguillansky | H04N 19/597 |
| 2022/0353532 | A1* | 11/2022 | Zakharchenko | H04N 19/597 |
| 2023/0105931 | A1* | 4/2023 | Van der Auwera | G06T 3/4007 382/232 |

OTHER PUBLICATIONS

"G-PCC Future Enhancements", 130, MPEG Meeting, Apr. 20, 2020-Apr. 24, 2020, ALPBACH, (Motion Picture Expert Group or ISO/IEC JTC1/SC29/WG11), No. n19328, Jul. 21, 2020, XP030289574, 140 Pages.

Iguchi, N., (Panasonic) et al., "[G-PCC] [New] Predictive Geometry Angular Mode Using Spherical LiDAR Data Input", 132, MPEG Meeting, Oct. 12, 2020-Oct. 16, 2020, Online, (Motion Picture Expert Group or ISO/IEC JTC1/SC29/WG11), No. m55361 Oct. 7, 2020, XP030292875, 4 Pages.

Ray, B., (Qualcomm) et al., "[G-PCC] [New] On Predictive Geometry Coding", 132, MPEG Meeting, Oct. 12, 2020-Oct. 16, 2020, Online, (Motion Picture Expert Group or ISO/IEC JTC1/SC29/WG11), No. m55376 Oct. 15, 2020 (Oct. 15, 2020), XP030291888, 6 Pages, Retrieved from the Internet: URL: https://dms.mpeg.expert/doc_end_user/documents/132_OnLine/wg11/m55376-v2-m55376-v2.zip m55376-v2/m55376-v1.docx [retrieved on Oct. 15, 2020].

Ray, B., (Qualcomm) et al., "[G-PCC] [New] On Single Laser Coding", 132, MPEG Meeting, Oct. 12, 2020-Oct. 16, 2020, Online, (Motion Picture Expert Group or ISO/IEC JTC1/SC29/WG11), No. m55377 Oct. 7, 2020 (Oct. 7, 2020), XP030292900, 2 Pages, Retrieved from the Internet: URL: https://dms.mpeg.expert/doc_end_user/documents/132_OnLine/wg11/m55377-v1-m55377-v1.zip m55377-v1/m55377-v1.docx [retrieved on Oct. 7, 2020].

Sugio, T., (Panasonic): "[G-PCC] Attribute Residual Coding in TMC13", 125th MPEG Meeting, Jan. 14, 2019-Jan. 18, 2019, Marrakech, MA (Motion Picture Expert Group or ISO/IEC JTC1/SC29/WG11), No. m46108, Jan. 9, 2019, XP030214607, 7 Pages.

International Search Report and Written Opinion—PCT/US2021/052366—ISA/EPO—dated Jan. 21, 2022, 15 pp.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

International Standard: "Information Technology—Coded Representation of Immersive Media—Part 9: Geometry-Based Point Cloud Compression", ISO/IEC FDIS 23090-9, Final Draft, 2022, 15 Pages.

\* cited by examiner

⊖ Root vertex

◯ Branch vertex with 1 child

⊕ Branch vertex with 2 children

◎ Branch vertex with 3 children

⦀ Leaf vertex

PREDICTIVE GEOMETRY CODING IN G-PCC

This application claims the benefit of U.S. Provisional Application No. 63/088,831, filed Oct. 7, 2020, and U.S. Provisional Application No. 63/114,317, filed Nov. 16, 2020, the entire contents of each of which are incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding nodes of a point cloud, such as for the Geometry Point Cloud Compression (G-PCC) standard currently being developed. However, the example techniques are not limited to the G-PCC standard. In some examples of G-PCC, coordinates of position of nodes (also referred to as points) of a point cloud may converted into a (r, $\phi$, i) domain in which a position of a node is represented by three parameters, a radius r, an azimuth $\phi$, and a laser index i. When using an angular mode for predictive geometry coding in G-PCC, a G-PCC coder may perform prediction in the (r, $\phi$, i) domain. For instance, the G-PCC coder may determine a predicted position of a node and add the predicted position of the node to primary residual data to determine a reconstructed position of the node. Accordingly, in at least some examples, the primary residuals may be coded in the (r, $\phi$, i) domain. Due to the errors in rounding (e.g., for coordinate conversion), coding in r, $\phi$, i may be lossy. In some examples, this loss may by reduced or eliminated by coding a second set of residuals, which may be in a Cartesian domain. However, some implementations of G-PCC may require a lot of context coded bins to signal the primary and secondary residuals, which may be undesirably computationally intensive.

In accordance with one or more aspects of this disclosure, a G-PCC coder may signal secondary residuals using a reduced number of contexts and/or context coded bins. For instance, as opposed to signaling an absolute value of a secondary residual value using two separate syntax elements (e.g., ptn_sec_residual_abs_minus2 coded with contexts 0 . . . 15, and ptn_sec_residual_abs_minus17 having 0 as a prefix context and bypass coding a suffix), the G-PCC coder may signal the absolute value of a secondary residual value using a single syntax element. For instance, the G-PCC coder may signal a single syntax element that specifies the absolute value of the secondary residual value, with a first set of prefix contexts (e.g., 0 . . . 4) and a second set of suffix contexts (e.g., 5 . . . 8). In this way, the techniques of this disclosure may reduce the number of contexts and/or context coded bins used to signal secondary residuals. As such, the techniques of this disclosure may reduce computational complexity of point cloud coding.

As noted above, when using the angular mode for predictive geometry coding in G-PCC, the G-PCC coder may determine a predicted position of a node and add the predicted position of the node to residual data to determine a reconstructed position of the node. G-PCC may provide several techniques to determine the predicted position of the node. As one example, G-PCC provides a zero prediction mode in which the r, $\phi$, i of the predicted position may be inferred to all be zero. As another example, G-PCC provides a delta prediction mode in which the r, $\phi$, i of the predicted position are inherited (e.g., copied) from the r, $\phi$, i of a reconstructed node (e.g., a parent node of a current node). However, zero prediction mode may be very inefficient and, as a result, the zero prediction may rarely be used.

In accordance with one or more techniques of this disclosure, a G-PCC coder may perform a modified zero prediction mode in which a subset of the components of a predicted position of a current node are inherited from a parent node. For instance, as opposed to inheriting all three of the r, $\phi$, i of the predicted position from the parent node, the G-PCC coder may inherit the $\phi$ and i of the predicted position from the parent node, and infer r to be a minimum value (e.g., 0 or a separately signaled minimum value). By inheriting the $\phi$ and i of the predicted position but not the r, the G-PCC coder may avoid having to signal large values of residual data for the r where the $\phi$ and i values are otherwise similar (and thus have small values for residual data). In this way, the techniques of this disclosure may improve the coding efficiency of point cloud coding.

In one example, a method of encoding a point cloud includes obtaining a value of a secondary residual for geometry coding a current predictive tree node of the point cloud; and encoding the value of the secondary residual, wherein encoding the value comprises: encoding, using a first set of context-adaptive binary arithmetic coding (CABAC) contexts, prefix bins of a syntax element having a value that specifies an absolute value of the value of the secondary residual minus 2; and encoding, using a second set of CABAC contexts that is different than the first set of contexts, suffix bins of the syntax element.

In another example, a method of decoding a point cloud includes obtaining a value of a secondary residual for geometry coding a current predictive tree node of the point cloud; and decoding the value of the secondary residual, wherein encoding the value comprises: decoding, using a first set of CABAC contexts, prefix bins of a syntax element having a value that specifies an absolute value of the value of the secondary residual minus 2; and decoding, using a second set of CABAC contexts that is different than the first set of contexts, suffix bins of the syntax element.

In another example, a device for encoding a point cloud includes: a memory configured to store at least a portion of the point cloud; and one or more processors implemented in circuitry and configured to: obtain a value of a secondary residual for geometry coding a current predictive tree node of the point cloud; and encode the value of the secondary residual, wherein, to encode the value, the one or more processors are configured to: encode, using a first set of CABAC contexts, prefix bins of a syntax element having a value that specifies an absolute value of the value of the secondary residual minus 2; and encode, using a second set of CABAC contexts that is different than the first set of contexts, suffix bins of the syntax element.

In another example, a device for decoding a point cloud includes: a memory configured to store at least a portion of the point cloud; and one or more processors implemented in circuitry and configured to: obtain a value of a secondary residual for geometry coding a current predictive tree node of the point cloud; and decode the value of the secondary residual, wherein, to decode the value, the one or more processors are configured to: decode, using a first set of CABAC contexts, prefix bins of a syntax element having a value that specifies an absolute value of the. value of the secondary residual minus 2; and decode, using a second set of CABAC contexts that is different than the first set of contexts, suffix bins of the syntax element.

In another example, a computer-readable storage medium stores instructions that, when executed, cause one or more processors of a point cloud encoder to: obtain a value of a secondary residual for geometry coding a current predictive tree node of the point cloud; and encode the value of the secondary residual, wherein, the instructions that cause the or more processors to encode the value comprise instructions that cause the one or more processors to: encode, using a first set of CABAC contexts, prefix bins of a syntax element having a value that specifies an absolute value of the value of the secondary residual minus 2; and encode, using a second set of CABAC contexts that is different than the first set of contexts, suffix bins of the syntax element.

In another example, a computer-readable storage medium stores instructions that, when executed, cause one or more processors of a point cloud decoder to: obtain a value of a secondary residual for geometry coding a current predictive tree node of the point cloud; and decode the value of the secondary residual, wherein, the instructions that cause the or more processors to decode the value comprise instructions that cause the one or more processors to: decode, using a first set of CABAC contexts, prefix bins of a syntax element having a value that specifies an absolute value of the value of the secondary residual minus 2; and decode, using a second set of CABAC contexts that is different than the first set of contexts, suffix bins of the syntax element.

In another example, a method of decoding a point cloud includes: selecting, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determining a radius, an azimuth, and a laser index of a parent node of the current predictive tree node; inferring an azimuth and a laser index of a predicted position of the current predictive tree node as the azimuth and the laser index of the parent node; inferring a radius of the predicted position to be a minimum radius value, wherein the minimum radius value is different than the radius of the parent node; and determining, based on the predicted position of the current predictive tree node, the position of the current predictive tree node.

In another example, a method of encoding a point cloud includes: selecting, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected mode is the zero prediction mode: determining a radius, an azimuth, and a laser index of a parent node of the current predictive tree node; inferring an azimuth and a laser index of a predicted position of the current predictive tree node as the azimuth and the laser index of the parent node; inferring a radius of the predicted position to be a minimum radius value, wherein the minimum radius value is different than the radius of the parent node; and determining, based on the predicted position of the current predictive tree node, the position of the current predictive tree node.

In another example, a device for decoding a point cloud includes: a memory configured to store at least a portion of the point cloud; and one or more processors implemented in circuitry and configured to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

In another example, a device for encoding a point cloud includes: a memory configured. to store at least a portion of the point cloud; and one or more processors implemented in circuitry and configured to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected mode is the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

In another example, a computer-readable storage medium stores instructions that, when executed, cause one or more processors of a point cloud decoding device to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node and determine, based on the predicted position of the current predictive tree node, the position of the current predictive tree node.

In another example, a computer-readable storage medium stores instructions that, when executed, cause one or more processors of a point cloud encoding device to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected prediction mode is zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

The details of one or more examples are set forth in the accompanying drawings and the description below. Other features, objects, and advantages will be apparent from the description, drawings, and claims.

DETAILED DESCRIPTION

Figure 1:
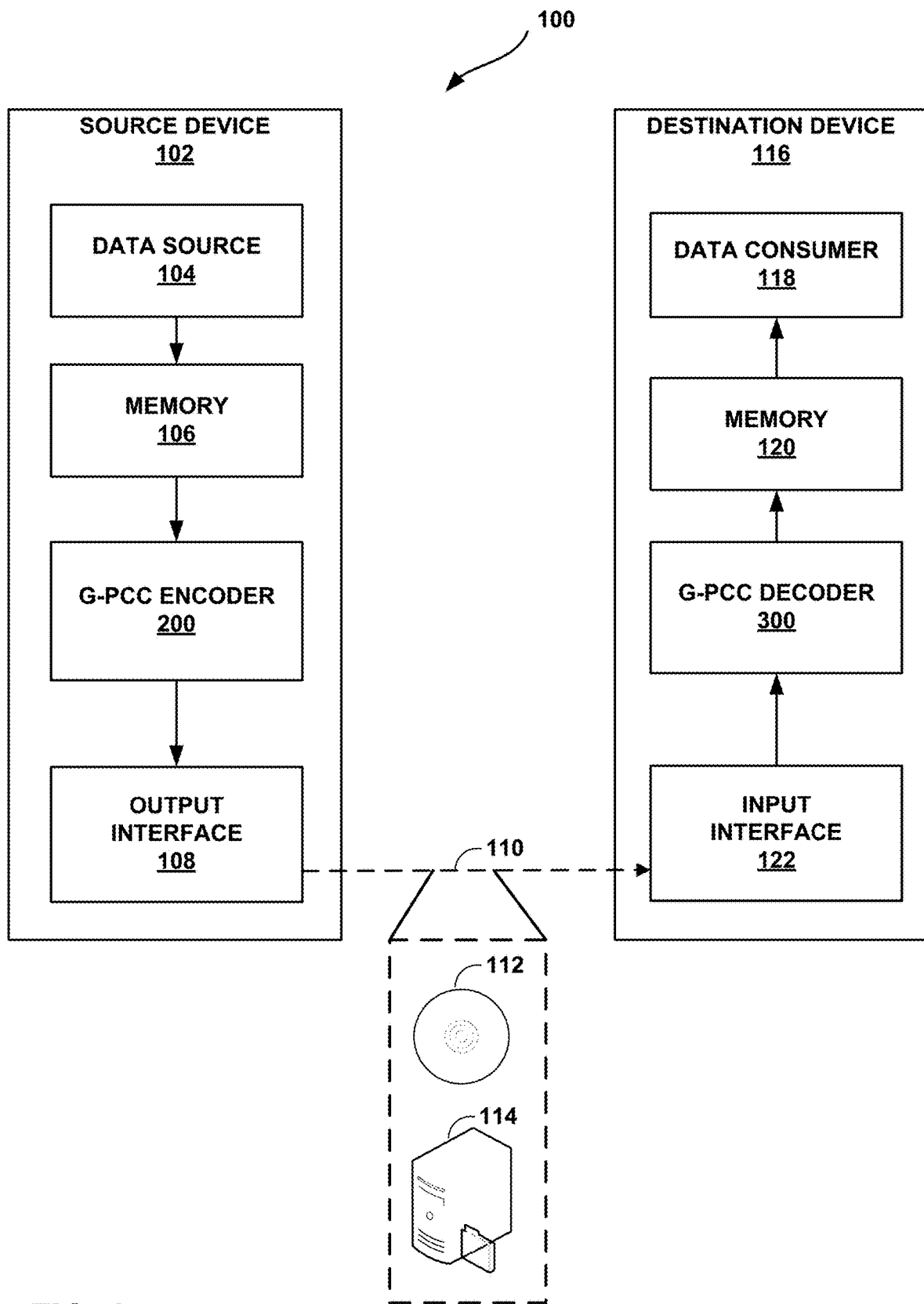
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19328, Brussels, Belgium, January 2020, and a description of the codec is available in G-PCC Codec Description v8, ISO/IEC JTC1/SC29/WG11 w19525, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
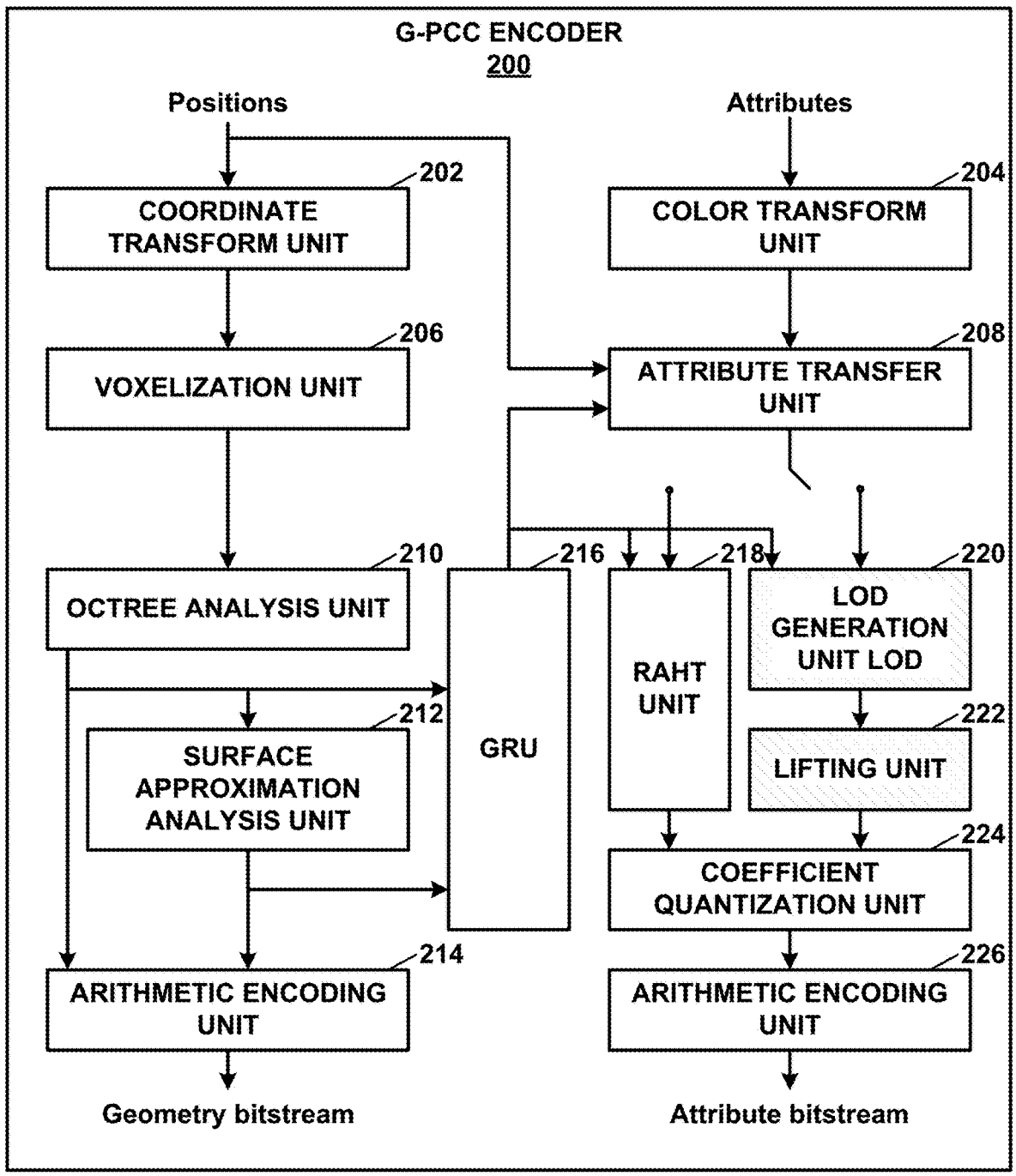
FIG. 2 is a block diagram illustrating an example Geometry Point Cloud Compression (G-PCC) encoder.
Figure 3:
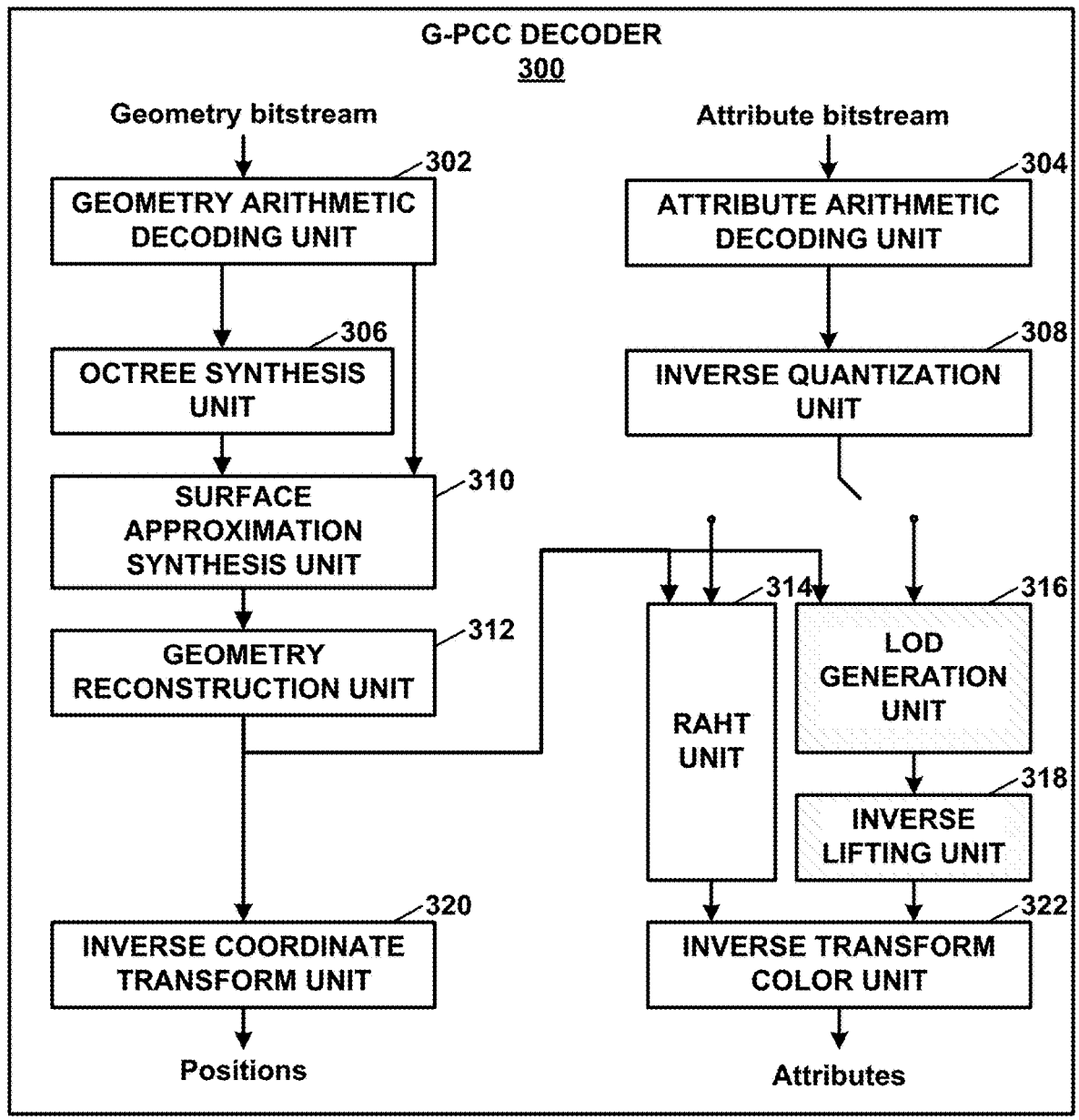
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit (GRU) 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
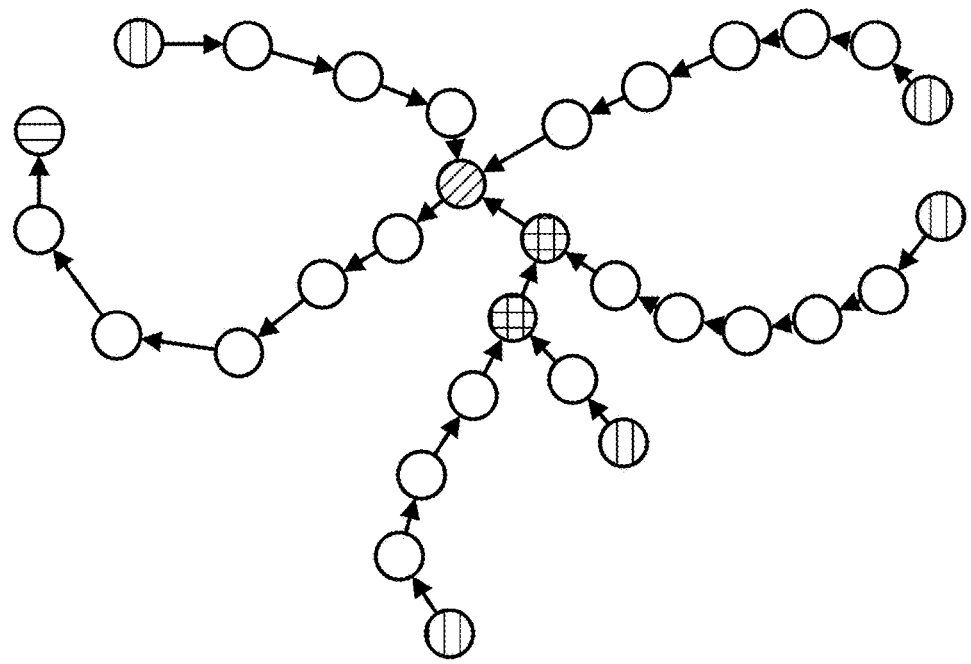
FIG. 4 is a conceptual diagram of a prediction tree for predictive geometry coding.

Predictive geometry coding was introduced as an alternative to the octree geometry coding, where the nodes are arranged in a tree structure (which defines the prediction structure), and various prediction strategies are used to predict the coordinates of each node in the tree with respect to its predictors. FIG. 4 is a conceptual diagram illustrating an example of a prediction tree, a directed graph where the arrow points to the prediction direction. The horizontally shaded node is the root vertex and has no predictors; the grid shaded nodes have two children; the diagonally shaded node has 3 children, the non-shaded nodes have one children and the vertically shaded nodes are leaf nodes and these have no children. Every node has only one parent node.

Four prediction strategies may be are specified for each node based on its parent (p0), grand-parent (p1) and great-grand-parent (p2). The prediction strategies include, no prediction, delta prediction (p0), linear prediction (2*p0−p1), and parallelogram prediction (2*p0+p1−p2).

The encoder (e.g., G-PCC encoder 200) may employ any algorithm to generate the prediction tree; the algorithm used may be determined based on the application/use case and several strategies may be used. The encoder may encode, for each node, the residual coordinate values in the bitstream starting from the root node in a depth-first manner. Predictive geometry coding may be particularly useful for Category 3 (e.g., LIDAR-acquired) point cloud data e.g., for low-latency applications.

Figure 5A:
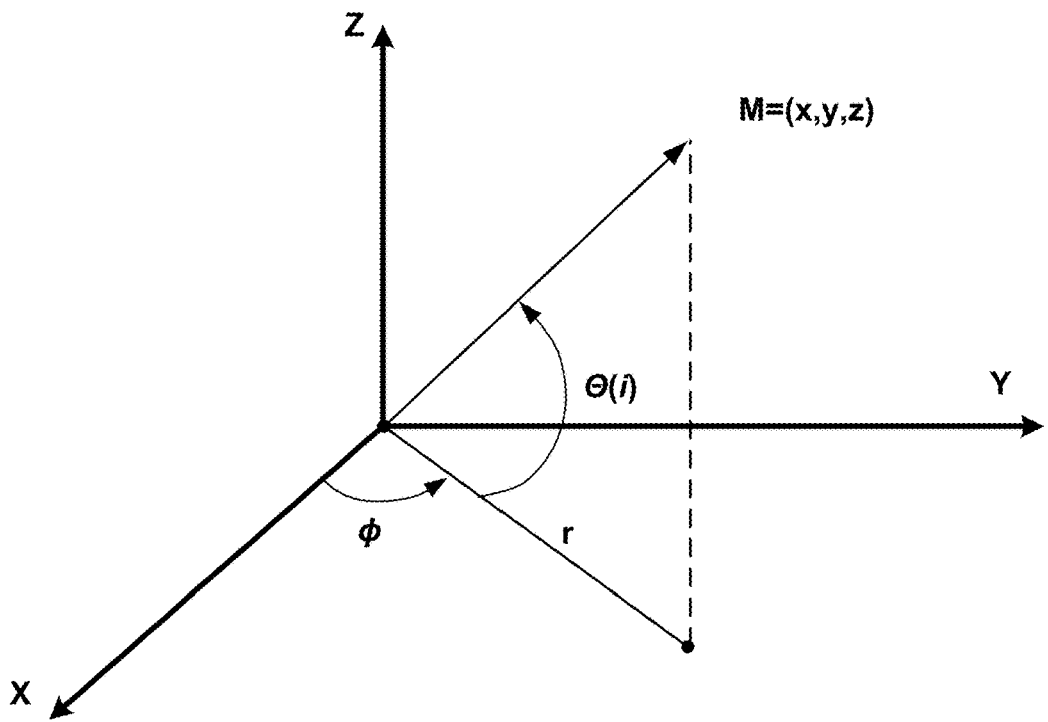
FIGS. 5A and 5B are conceptual diagrams of a spinning LIDAR acquisition model.
Figure 5B:
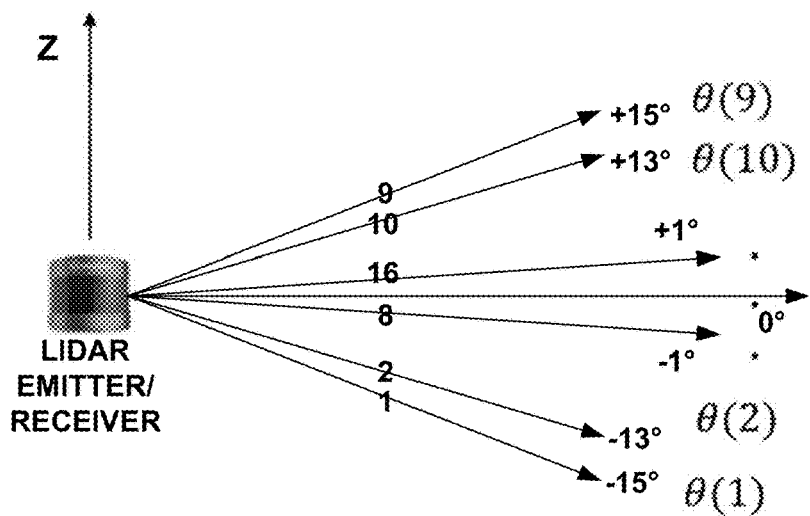

Angular mode may be used in predictive geometry coding, where the characteristics of LIDAR sensors may be utilized in coding the prediction tree more efficiently. The coordinates of the positions are converted to the (r, φ, i) (radius, azimuth, and laser index) and a prediction is performed in this domain (the residuals are coded in r, φ, i domain). Due to the errors in rounding, coding in r, φ, i is not lossless and hence a second set of residuals may be coded which correspond to the Cartesian coordinates. A description of the encoding and decoding strategies used for angular mode for predictive geometry coding is reproduced below. The description is based on FIGS. 5A and 5B, which are conceptual diagrams of a spinning LIDAR acquisition model.

The method focuses on point clouds acquired using a spinning LIDAR model. Here, the LIDAR has N lasers (e.g., N=16, 32, 64) spinning around the Z axis according to an azimuth angle φ (see FIGS. 5A and 5B). Each laser may have different elevation $\theta(i)_{i=1...N}$ and height $\varsigma(i)_{i=1...N}$. Supposing that the laser i hits a point M, with cartesian integer coordinates (x, y, z), defined according to the coordinate system described in FIG. 5A.

The position of M is modeled with three parameters (r, φ, i), which are computed as follows:

$$r = \sqrt{x^2 + y^2}$$
$$\phi = \text{atan2}(y, x)$$
$$i = \arg\min_{j=1...N} \{z + \varsigma(j) - r \times \tan(\theta(j))\},$$

More precisely, a G-PCC coder may use the quantized version of (r, φ, i), denoted (r̃, φ̃, i), where the three integers r̃, φ̃ and i are computed as follows:

$$\tilde{r} = \text{floor}\left(\frac{\sqrt{x^2 + y^2}}{q_r} + o_r\right) = hypot(x, y)$$
$$\tilde{\phi} = \text{sign}(\text{atan2}(y, x)) \times \text{floor}\left(\frac{|\text{atan2}(y, x)|}{q_\phi} + o_\phi\right)$$
$$i = \arg\min_{j=1...N} \{z + \varsigma(j) - r \times \tan(\theta(j))\}$$

where
- $(q_r, o_r)$ and $(q_\phi, o_\phi)$ are quantization parameters controlling the precision of φ̃ and r̃, respectively.
- sign(t) is the function that return 1 if t is positive and (−1) otherwise.
- |t| is the absolute value of t.

To avoid reconstruction mismatches due to the use of floating-point operations, the values of $\varsigma(i)_{i=1...N}$ and $\tan(\theta(i))_{i=1...N}$ may be pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$
$$\tilde{t}(i) = \text{sign}(\varsigma(\tan(\theta(j)))) \times \text{floor}\left(\frac{|\tan(\theta(j))|}{q_\theta} + o_\theta\right)$$

where
- $(q_\varsigma, o_\varsigma)$ and $(q_\theta, o_\theta)$ are quantization parameters controlling the precision of ς̃ and θ̃, respectively.

The reconstructed cartesian coordinates are obtained as follows:
$$\hat{x} = \text{round}(\tilde{r} \times q_r \times \text{app\_cos}(\tilde{\phi} \times q_\phi))$$
$$\hat{y} = \text{round}(\tilde{r} \times q_r \times \text{app\_sin}(\tilde{\phi} \times q_\phi))$$
$$\hat{z} = \text{round}(\tilde{r} \times q_r \times \tilde{t}(i) \times q_\theta - \tilde{z}(i) \times q_\varsigma),$$

where app_cos(.) and app_sin(.) are approximation of cos(.) and sin(.). The calculations could be using a fixed-point representation, a look-up table and linear interpolation.

Note that (x̂, ŷ, ẑ) may be different from (x, y, z) due to various reasons:
- quantization
- approximations
- model imprecision
- model parameters imprecisions Let $(r_x, r_y, r_z)$ be the reconstruction residuals defined as follows:

$$r_x = x - \hat{x}$$
$$r_y = y - \hat{y}$$
$$r_z = z - \hat{z}$$

In this method, G-PCC encoder 200 may proceed as follows:

Encode the model parameters $\tilde{t}(i)$ and $\tilde{z}(i)$ and the quantization parameters $q_r$, $q_\varsigma$, $q_\theta$ and $q_\phi$ Apply the geometry predictive scheme described in G-PCC DIS to the representation ($\tilde{r}$, $\tilde{\phi}$, i)

A new predictor leveraging the characteristics of lidar could be introduced. For instance, the rotation speed of the lidar scanner around the z-axis is usually constant. Therefore, we could predict the current $\tilde{\phi}(j)$ as follows:

$$\tilde{\phi}(j) = \tilde{\phi}(j-1) + n(j) \times \delta_\phi(k)$$

Where $(\delta_\phi(k))_{k=1\ldots K}$ is a set of potential speeds the encoder could choose from. The index k could be explicitly written to the bitstream or could be inferred from the context based on a deterministic strategy applied by both the encoder and the decoder, and n(j) is the number of skipped points, which could be explicitly written to the bitstream or could be inferred from the context based on a deterministic strategy applied by both the encoder and the decoder.

Encode with each node the reconstruction residuals ($r_x$, $r_y$, $r_z$)

G-PCC decoder 300 may proceed as follows:

Decode the model parameters $\tilde{t}(i)$ and $\tilde{z}(i)$ and the quantization parameters $q_r$, $q_\varsigma$, $q_\theta$ and $q_\phi$ Decode the ($\tilde{r}$, $\tilde{\phi}$, i) parameters associated with the nodes according to the geometry predictive scheme described in G-PCC DIS Computes the reconstructed coordinates ($\hat{x}$, $\hat{y}$, $\hat{z}$) as described above Decodes the residuals ($r_x$, $r_y$, $r_z$)

As discussed in the next section, lossy compression could be supported by quantizing the reconstruction residuals ($r_x$, $r_y$, $r_z$)

Compute the original coordinates (x, y, z) as follows $$x = r_x + \hat{x}$$
$$y = r_y + \hat{y}$$
$$z = r_z + \hat{z}$$

Lossy compression could be achieved by applying quantization to the reconstruction residuals ($r_x$, $r_y$, $r_z$) or by dropping points.

The quantized reconstruction residuals are computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

In some examples, G-PCC encoder 200 and/or G-PCC decoder 300 may use Trellis quantization to further improve the RD (rate-distortion) performance results. The quantization parameters may change at sequence/frame/slice/block level to achieve region adaptive quality and for rate control purposes.

What follows is an example predictive geometry coding syntax, semantics, syntax binarization, and context table:

|  | Descriptor |
|---|---|
| geometry_predtree_node( nodeIdx ) { |  |
|   if( geom_scaling_enabled_flag && !( nodeIdx % PtnQpInterval ) ) { |  |
|     ptn_qp_offset_eq0_flag | ae(v) |
|     if( !ptn_qp_offset_eq0_flag ) { |  |
|       ptn_qp_offset_sign_flag | ae(v) |
|       ptn_qp_offset_abs_minus1 | ae(v) |
|     } |  |
|   } |  |
|   if( unique_geometry_points_flag ) { |  |
|     ptn_point_cnt_gt1_flag | ae(v) |
|     if( ptn_point_cnt_gt1_flag ) |  |
|       ptn_point_cnt_minus2 | ae(v) |
|   } |  |
|   ptn_child_cnt[ nodeIdx ] | ae(v) |
|   ptn_pred_mode[ nodeIdx ] | ae(v) |
|   if( geometry_angular_enabled_flag && ptn_pred_mode[ nodeIdx ] == 1 ) { |  |
|     ptn_phi_mult_eq0_flag | ae(v) |
|     if( !ptn_phi_mult_eq0_flag ) { |  |
|       ptn_phi_mult_sign_flag | ae(v) |
|       ptn_phi_mult_eq1_flag | ae(v) |
|       if( !ptn_phi_mult_eq1_flag ) |  |
|         ptn_phi_mult_abs_minus2 | ae(v) |
|       if( ptn_phi_mult_abs_minus2 == 15 ) |  |
|         ptn_phi_mult_abs_minus17 | ae(v) |
|     } |  |
|   } |  |
|   for( k = 0; k < 3; k++ ) { |  |
|     ptn_residual_eq0_flag[ k ] | ae(v) |
|     if( !ptn_residual_eq0_flag[ k ] ) { |  |
|       ptn_residual_sign_flag[ k ] | ae(v) |
|       ptn_residual_abs_log2[ k ] | ae(v) |
|       ptn_residual_abs_remaining[ k ] | ae(v) |
|     } |  |
|   } |  |
| } |  |

| | Descriptor |
|---|---|
| if( geometry_angular_enabled_flag )<br> for( k = 0; k < 3; k++ ) {<br> ptn_sec_residual_eq0_flag[ k ] | ae(v) |
| if( !ptn_sec_residual_eq0_flag[ k ] ) {<br> ptn_sec_residual_sign_flag[ k ] | ae(v) |
| ptn_sec_residual_eq1_flag[ k ] | ae(v) |
| if( !ptn_sec_residual_eq1_flag[ k ] )<br> ptn_sec_residual_abs_minus2[ k ] | ae(v) |
| if( ptn_sec_residual_abs_minus2[ k ] = = 15 )<br> ptn_sec_residual_abs_minus17[ k ] | ae(v) |
| }<br> }<br> for( i = 0; i < ptn_child_cnt; i++)<br> geometry_predtree_node( ++PtnNodeIdx )<br>} | | ptn_qp_offset_eq0_flag, ptn_qp_offset_sign_flag, and ptn_qp_offset_abs_minus1 together specify, when present, an offset to the slice geometry quantisation parameter. Any of ptn_qp_offset_sign_flag, or ptn_qp_offset_abs_minus1 that are not present are inferred to be 0.

When nodeIdx % PtnQpInterval is equal to 0, the node QP for the next PtnQpInterval nodes in decoding order is determined as follows:

When geom_scaling_enabled_flag is equal to 1:

PtnQp[nodeIdx/PtnQpInterval]=geom_base_qp+geom_slice_qp_offset+(2×ptn_qp_offset_sign_flag−1)×(!ptn_qp_offset_eq0_flag+ptn_qp_offset_abs_minus1)

Otherwise, PtnQp[nodeIdx] is set equal to 0.

ptn_point_cnt_gt1_flag and ptn_point_cnt_minus2 together specify the number of points represented by the current predictive tree node. When not present, the values of ptn_point_cnt_gt1_flag and ptn_point_cnt_minus2 are bath inferred to be 0. The number of points represented by the current predictive tree node is derived as follows:

PtnPointCount[nodeIdx]=1+ptn_point_cnt_gt1_flag+ptn_point_cnt_minus2 ptn_child_cnt[nodeIdx] is the number of direct child nodes of the current predictive tree node present in the geometry predictive tree.

ptn_pred_mode[nodeIdx] is a mode used to predict the position associated with the current node.

ptn_phi_mult_eq0_flag, ptn_phi_mult_sign_flag, ptn_phi_mult_eq1_flag, ptn_phi_mult_abs_minus2, and ptn_phi_mult_abs_minus17 together specify a multiplicative factor used in delta angular prediction. ptn_phi_mult_eq0_flag, when present, specifies whether the factor is equal to zero. ptn_phi_mult_eq1_flag, when present, specifies whether the factor's magnitude is equal to one. ptn_phi_mult_sign_flag equal to 1 indicates that the factor's sign is positive. ptn_phi_mult_sign_flag equal to 0 indicates that the factor's sign is negative. Any of ptn_phi_mult_sign_flag, ptn_phi_mult_abs_minus2, or ptn_phi_mult_abs_minus17 that are not present are inferred to be 0. Any of pnt_phi_mult_eq0_flag, or ptn_phi_mult_eq1_flag that are not present are inferred to be 1.

The phi factor for the current tree node is derived as follows:

PtnPhiMult[nodeIdx]=(2×ptn_phi_mult_sign_flag−1)×(!ptn_phi_mult_eq0_flag+!ptn_phi_mult_eq1_flag+ptn_phi_mult_abs_minus2+ptn_phi_mult_abs_minus17)

ptn_residual_eq0_flag[k], ptn_residual_sign_flag[k], ptn_residual_abs_log 2[k], and ptn_residual_abs_remaining[k] together specify the first prediction residual of the k-th geometry position component. ptn_residual_eq0_flag[k] specifies whether the residual component is equal to zero. ptn_residual_sign_flag[k] equal to 1 indicates that the sign of the residual component is positive. ptn_residual_sign_flag[k] equal to 0 indicates that the sign of the residual component is negative. Any of ptn_residual_sign_flag[k], ptn_residual_abs_log 2[k], or ptn_residual_abs_remaining[k] that are not present are inferred to be 0.

The first prediction residual associated with the current tree node is derived as follows:

for (k=0; k<3; k++)

PtnResidual[nodeIdx][k]=(2×ptn_residual_sign_flag−1)×(!ptn_residual_eq0_flag[k]+((1<<ptn_residual_abs_log 2[k])>>1)+ptn_residual_abs_remaining[k])

ptn_sec_residual_eq0_flag[k], ptn_sec_residual_eq1_flag[k], ptn_sec_residual_sign_flag[k], ptn_sec_residual_abs_minus2[k], and ptn_sec_residual_abs_minus17[k] together specify the secondary residual of the k-th geometry position component. ptn_sec_residual_eq0_flag[k] specifies whether the residual component is equal to zero. ptn_sec_residual_eq1_flag[k], when present, specifies whether the residual component magnitude is equal to one. ptn_sec_residual_sign_flag[k] equal to 1 indicates that the sign of the residual component is positive. ptn_sec_residual_sign_flag[k] equal to 0 indicates that the sign of the residual component is negative. Any of ptn_src_residual_sign_flag[k], ptn_sec_residual_abs_minus2[k], or ptn_sec_residual_abs_minus17[k] that are not present are inferred to be 0. Any of ptn_sec_residual_eq0_flag[k], or ptn_sec_residual_eq1_flag[k] that are not present are inferred to be 1.

The second prediction residual associated with the current tree node is derived as follows:

for (k=0; k<3; k++)

PtnSecResidual[nodeIdx][k]=(2×ptn_sec_residual_sign_flag−1)×(!ptn_sec_residual_eq0_flag[k]+!ptn_sec_residual_eq1_flag[k]+ptn_sec_residual_abs_minus2[k]+ptn_sec_residual_abs_minus17[k])

| | | |
|---|---|---|
| geometry_predtree_node ( ) | ptn_qp_offset_eq0_flag | 9.6.1 (FL), numBins = 1 |
| | ptn_qp_offset_sign_flag | 9.6.1 (FL), numBins = 1 |
| | ptn_qp_offset_abs_minus1 | 9.6.2 (EGk), k = 0 |
| | ptn_point_cnt_gt1_flag | 9.6.1 (FL), numBins = 1 |
| | ptn_point_cnt_minus2 | 9.6.2 (EGk), k = 0 |
| | ptn_child_cnt[ ] | 9.6.1 (FL), numBins = 2 |
| | ptn_pred_mode[ ] | 9.6.1 (FL), numBins = 2 |
| | ptn_phi_mult_eq0_flag | 9.6.1 (FL), numBins = 1 |
| | ptn_phi_mult_sign_flag | 9.6.1 (FL), numBins = 1 |
| | ptn_phi_mult_eq1_flag | 9.6.1 (FL), numBins = 1 |
| | ptn_phi_mult_abs_minus2 | 9.6.1 (FL), numBins = 4 |
| | ptn_phi_mult_abs_minus17 | 9.6.2 (EGk), k = 0 |
| | ptn_residual_eq0_flag[ ] | 9.6.1 (FL), numBins = 1 |
| | ptn_residual_sign_flag[ ] | 9.6.1 (FL), numBins = 1 |
| | ptn_residual_abs_log2[ k ] | 9.6.1 (FL), numBins = PtnResidualAbsLog2Bits[ k ] |
| | ptn_residual_abs_remaining[ k ] | 9.6.1 (FL), numBins = ptn_residual_abs_log2[ k ] − 1 |
| | ptn_sec_residual_eq0_flag[ k ] | 9.6.1 (FL), numBins = 1 |
| | ptn_sec_residual_sign_flag[ k ] | 9.6.1 (FL), numBins = 1 |
| | ptn_sec_residual_eq1_flag[ k ] | 9.6.1 (FL), numBins = 1 |
| | ptn_sec_residual_abs_minus2[ k ] | 9.6.1 (FL), numBins = 4 |
| | ptn_sec_residual_abs_minus17[ k ] | 9.6.2 (EGk), k = 0 |

| | | |
|---|---|---|
| ptn_point_cnt_gt1_flag | 38 | 0 |
| ptn_point_cnt_minus2 | 39 | prefix: 0 suffix: bypass |
| ptn_child_cnt[ ] | 40 | 0 .. 2 (XREF) |
| ptn_pred_mode[ ] | 41 | 0 .. 2 (XREF) |
| ptn_phi_mult_eq0_flag | 50 | 0 |
| ptn_phi_mult_sign_flag | 51 | 0 |
| ptn_phi_mult_eq1_flag | 52 | 0 |
| ptn_phi_mult_abs_minus2 | 53 | 0 .. 15 |
| ptn_phi_mult_abs_minus17 | 54 | 0 |
| ptn_residual_eq0_flag[ k ] | 42 | k |
| ptn_residual_sign_flag[ k ] | 43 | k |
| ptn_residual_abs_log2[ k ] | 44 | 0 .. 526 (XREF) |
| ptn_residual_abs_remaining[ ] | na | bypass |
| ptn_sec_residual_eq0_flag[ k ] | 55 | k |
| ptn_sec_residual_sign_flag[ k ] | 56 | k |
| ptn_sec_residual_eq1_flag[ k ] | 57 | k |
| ptn_sec_residual_abs_minus2[ k ] | 58 + k | 0 .. 15 |
| ptn_sec_residual_abs_minus17[ k ] | 61 + k | prefix: 0 suffix: bypass |

The above implementation of predictive geometry coding may present one or more disadvantages. As one example, the above implementation of predictive geometry coding with angular coding mode may requires a lot of context coded bins, as the above implementation requires coding of both primary (r, ϕ, i) and secondary ($r_x$, $r_y$, $r_z$) residuals, which is computationally intensive. As another example, for the signaling of predictor index and number of child signaling (both cases have total 4 candidates), the above implementation of predictive geometry coding uses 2 bit fixed length coding, which may not be optimal as the candidates are not equi-probable. As another example, for the primary residual in the above implementation of predictive geometry coding, the signaling associated with laser index (i) may be redundant, such as when the point count is captured using a single laser. As another example, in the above implementation of predictive geometry coding, zero-predictor (or "no prediction" described above) is very inefficient and it may rarely be used for the prediction. Moreover, for the "r" part, as it is non-negative, and the as prediction is always zero, the sign of the residual for "r" component can always be inferred, and hence the corresponding signaling is redundant.

In accordance with one or more techniques of this disclosure, an encoder (e.g., G-PCC encoder 200) and/or a decoder (e.g., G-PCC decoder 300) may overcome the aforementioned disadvantages. As a first example, the encoder and/or the decoder may perform a reduction of context and context coded bins for secondary residual and phi multiplier. As a second example, the encoder and/or the decoder may perform variable length coding for number of child and predictor index signaling. As a third example, the encoder and/or decoder may remove the signaling of laser index when content is captured by single laser. As a fourth example, the encoder and/or the decoder may modify zero prediction by utilizing the azimuth and laser index of parent neighbor, and sign inference.

Some details examples of the techniques of this disclosure follow:

As discussed above, in accordance with the first example, the encoder and/or the decoder may perform a reduction of context and context coded bins for secondary residual and phi multiplier. For instance, the secondary residual coding may be simplified by removing ptn_sec_residual_abs_minus17[k] syntax element and associated 3*15=45 contexts. In some examples, the binarization and contexts for ptn_sec_residual_abs_minus2[k] may be modified. Some example modifications are show below with additions in <ADD> . . . </ADD> tags and removals in <REMOVE> . . . </REMOVE> tags.

```
if( geometry_angular_enabled_flag )
    for( k = 0; k < 3; k++ ) {
        ptn_sec_residual_eq0_flag[ k ]                  ae(v)
        if( !ptn_sec_residual_eq0_flag[ k ] ) {
            ptn_sec_residual_sign_flag[ k ]             ae(v)
            ptn_sec_residual_eq1_flag[ k ]              ae(v)
            if( !ptn_sec_residual_eq1_flag[ k ] )
                ptn_sec_residual_abs_minus2[ k ]        ae(v)
<REMOVE>if( ptn_sec_residual_abs_minus2[ k ] = =
15 )
                ptn_sec_residual_abs_minus17[ k ]       ae(v)
                                                    </REMOVE>
        }
    }
``` ptn_sec_residual_eq0_flag[k], ptn_sec_residual_eq1_flag[k], ptn_sec_residual_sign_flag[k], <ADD> and </ADD>ptn_sec_residual_abs_minus2[k], <REMOVE> and ptn_sec_residual_abs_minus17[k]</REMOVE> together specify the secondary residual of the k-th geometry position component. ptn_sec_residual_eq0_flag[k] specifics whether the residual component is equal to zero. ptn_sec_residual_eq1_flag[k], when present, specifies whether the residual component magnitude is equal to one. ptn_sec_residual_sign_flag[k] equal to 1 indicates that the sign of the residual component is positive. ptn_sec_residual_sign_flag[k] equal to 0 indicates that the sign of the residual component is negative. Any of ptn_src_residual_sign_flag[k], <ADD> or </ADD>ptn_sec_residual_abs_minus2[k], <REMOVE> or ptn_sec_residual_abs_minus17[k]</REMOVE> that are not present are inferred to be 0. Any of ptn_sec_residual_eq0_flag[k], or ptn_sec_residual_eq1_flag[k] that are not present are inferred to be 1.

The second prediction residual associated with the current tree node is derived as follows:

for (k=0; k<3; k++)

$$\text{PtnSecResidual}[nodeIdx][k]=(2\times\text{ptn\_sec\_residual\_sign\_flag}-1)\times(!\text{ptn\_sec\_residual\_eq0\_flag}[k]+!\text{ptn\_sec\_residual\_eq1\_flag}[k]+\text{ptn\_sec\_residual\_abs\_minus2}[k]\text{<REMOVE>}+\text{ptn\_sec\_residual\_abs\_minus17}[k]\text{</REMOVE>})$$

| | | |
|---|---|---|
| geometry_predtree_node() | ptn_qp_offset_eq0_flag | 9.6.1 (FL), numBins = 1 |
| | ptn_sec_residual_eq0_flag[ k ] | 9.6.1 (FL), numBins = 1 |
| | ptn_sec_residual_sign_flag[ k ] | 9.6.1 (FL), numBins = 1 |
| | ptn_sec_residual_eq1_flag[ k ] | 9.6.1 (FL), numBins = 1 |
| | ptn_sec_residual_abs_minus2[ k ] | <REMOVE> 9.6.1 (FL), numBins = 4</REMOVE> <ADD> 9.6.2 (EGk), k = 0 </ADD> |
| | <REMOVE>ptn_sec_residual_abs_minus17[ k ] | 9.6.2 (EGk), k = 0 </REMOVE> |

| | | |
|---|---|---|
| ptn_sec_residual_eq0_flag[ k ] | 55 | k |
| ptn_sec_residual_sign_flag[ k ] | 56 | k |
| ptn_sec_residual_eq1_flag[ k ] | 57 | k |
| ptn_sec_residual_abs_minus2[ k ] | 58 + k | <REMOVE> 0 .. 15 </REMOVE> <ADD> prefix: 0 suffix: bypass </ADD> |
| <REMOVE> ptn_sec_residual_abs_minus17[ k ] | 61 + k | prefix: 0 suffix: bypass </REMOVE> |

Alternatively, the G_PCC coder may perform the signaling using a certain number of prefix contexts (e.g, a contexts) and suffix contexts (e.g., b contexts) for exponential Golomb coding. The use of prefix contexts and suffix context may be effective (e.g., provide coding gains) when there is a considerable energy in secondary residual components. In one example: a=5, b=4.

| | | |
|---|---|---|
| ptn_sec_residuai_eq0_flag[ k ] | 55 | k |
| ptn_sec_residual_sign_flag[k] | 56 | k |
| ptn_ sec_residual_eq1_flag[ k ] | 57 | k |
| ptn_sec_residual_abs_minus2[ k ] | 58 + k | <REMOVE> 0 .. 15 </REMOVE> <ADD>prefix: 0....(a−1) suffix: a.....(a+b−1) </ADD> |
| <REMOVE>ptn_sec_residual_abs_minus17[ k ] | 61 + k | prefix: 0 suffix: bypass</REMOVE> |

Secondly, the syntax associated with the phi multiplier is simplified by removing 8 contexts and modifying the signaling, details are as follows:

```
if( geometry_angular_enabled_flag && ptn_pred_mode[
    nodeIdx ]
 = = 1 ) {
    ptn_phi_mult_eq0_flag                                    ae(v)
    if( !ptn_phi_mult_eq0_flag ) {
        ptn_phi_mult_sign_flag                               ae(v)
        ptn_phi_mult_eq1_flag                                ae(v)
        if( !ptn_phi_mult_eq1_flag)
            ptn_phi_mult_abs_minus2                          ae(v)
        if( ptn_phi_mult_abs_minus2 = =
<REMOVE>15</REMOVE> <ADD>7</ADD>)
            <REMOVE>ptn_phi_mult_abs_minus17                 ae(v)
</REMOVE> <ADD>ptn_phi_mult_abs_minus9</ADD>
    }
}
``` ptn_phi_mult_eq0_flag, ptn_phi_mult_sign_flag, ptn_phi_mult_eq1_flag, ptn_phi_mult_abs_minus2, and <REMOVE> ptn_ phi_ mult_abs_minus17</REMOVE> <ADD> ptn_phi_mult_abs_minus9</ADD> together specify a multiplicative factor used in delta angular prediction. ptn_phi_mult_eq0_flag, when present, specifies whether the factor is equal to zero. ptn_phi_mult_eq1_flag, when present, specifies whether the factor's magnitude is equal to one. ptn_phi_mult_sign_flag equal to 1 indicates that the factor's sign is positive. ptn_phi_mult_sign_flag equal to 0 indicates that the factor's sign is negative. Any of ptn_phi_mult_sign_ flag, ptn_phi_mult_abs_minus2, or <REMOVE> ptn_ phi_mult_abs_minus17</REMOVE><ADD>ptn_phi_ mult_abs_minus9</ADD> that are not present are inferred to be 0. Any of ptn_phi_mult_eq0_flag, or ptn_phi_mult_eq1_flag that are not present are inferred to be 1.

The phi factor for the current tree node is derived as follows:

$$PtnPhiMult[nodeIdx] = (2 \times ptn\_phi\_mult\_sign\_flag - 1) \times (!ptn\_phi\_mult\_eq0\_flag + ! ptn\_phi\_mult\_eq1\_flag + ptn\_phi\_mult\_abs\_minus2 + \text{<REMOVE>}ptn\_phi\_mult\_abs\_minus17\text{</REMOVE>}\text{<ADD>}ptn\_phi\_mult\_abs\_minus9\text{</ADD>})$$

| geometry_predtree_node( ) | ptn_qp_offset_eq0_flag | 9.6.1 (FL), numBins = 1 |
|---|---|---|
| | ptn_phi_mult_eq0_flag | 9.6.1 (FL), numBins = 1 |
| | ptn_phi_mult_sign_flag | 9.6.1 (FL), numBins = 1 |
| | ptn_phi_mult_eq1_flag | 9.6.1 (FL), numBins = 1 |
| | ptn_phi_mult_abs_minus2 | 9.6.1 (FL), numBins = <REMOVE>4</REMOVE> <ADD>3</ADD> |
| | <REMOVE>ptn_phi_mult_abs_minus17 </REMOVE> <ADD>ptn_phi_mult_abs_minus9</ADD> | 9.6.2 (EGk), k = 0 |

| | | |
|---|---|---|
| ptn_phi_mult_eq0_flag | 50 | 0 |
| ptn_phi_mult_sign_flag | 51 | 0 |
| ptn_phi_mult_eq1_flag | 52 | 0 |
| ptn_phi_mult_abs_minus2 | 53 | 0 .. <REMOVE>15</REMOVE> <ADD> 7</ADD> |
| <REMOVE>ptn_phi_mult_abs_minus 17 </REMOVE> <ADD>ptn_phi_mult_abs_minus9</ADD> | 54 | 0 |

As discussed above, in accordance with the second example, the encoder and/or the decoder may perform variable length coding for number of child and predictor index signaling. Currently, predictor mode and Number of Child signaling information both signaled in 2 bits fixed length coding with 3 contexts with the following mapping:

| Prediction | Ptn_pred_mode | Number of Child | Ptn_child_cnt |
|---|---|---|---|
| Zero prediction | 00 | 0 | 00 |
| Delta prediction | 01 | 1 | 01 |
| Linear prediction | 10 | 2 | 10 |
| Parallelogram prediction | 11 | 3 | 11 |

However, to account for the un-equiprobable symbol statistics, it is proposed to signal with a variable length binarization, for example, truncated unary binarization. It may reduce the overall number of bins associated with the signaling. As the statistics of predMode may be different depending on whether angular mode is applied, different mapping may be used depending on whether angular mode is enabled or not which is already signaled in the corresponding geometry parameter set.

| Prediction | Ptn_pred_mode Angular on/off | Number of Child | Ptn_child_cnt |
|---|---|---|---|
| Zero prediction | 111/111 | 0 | 10 |
| Delta prediction | 0/110 | 1 | 0 |
| Linear prediction | 10/10 | 2 | 110 |
| Parallelogram prediction | 110/0 | 3 | 111 |

| | | |
|---|---|---|
| geometry_predtree_node( ) | ptn_qp_offset_eq0_flag | 9.6.1 (FL), numBins = 1 |
| | ptn_qp_offset_sign_flag | 9.6.1 (FL), numBins = 1 |
| | ptn_qp_offset_abs_minus1 | 9.6.2 (EGk), k = 0 |
| | ptn_point_cnt_gt1_flag | 9.6.1 (FL), numBins = 1 |
| | ptn_point_cnt_minus2 | 9.6.2 (EGk), k = 0 |
| | ptn_child_cnt[ ] | <REMOVE> 9.6.1 (FL), numBins = 2 </REMOVE> <ADD> 9.6.3 (TU), maxVal = 3 </ADD> |
| | ptn_pred_mode [ ] | <REMOVE> 9.6.1 (FL), numBins = 2 </REMOVE> <ADD> 9.6.3 (TU), maxVal = 3 </ADD> |
| ptn_child_cnt[ ] | 40 | <REMOVE> 0 .. 2 (XREF) </REMOVE> <ADD> Min(BinIdx, 1) </ADD> |
| ptn_pred_mode[ ] | 41 | <REMOVE> 0 .. 2 (XREF) </REMOVE> <ADD> Min(BinIdx, 1) </ADD> |

As discussed above, in accordance with the third example, the encoder and/or decoder may remove the signaling (e.g., not encode and not decode) of laser index when content is captured by single laser. When num_lasers_minus1 is equal to 0, laser index is the same for all the point in the point cloud. So, associated residual signaling for laser index may be redundant (i.e., the residual of third component is not needed to be signaled). The changes in the syntax is shown below considering the third component corresponds to laser index. (It may change if the axis conversion is present).

```
<ADD> numComp = (geometry_angular_enabled_flag
&& !num_lasers_minus1)? 2 : 3 </ADD>
    for( k = 0; k < <REMOVE> 3 </REMOVE> <ADD>
    numComp </ADD>; k++ ) {
        ptn_residual_eq0_flag[ k ]                 ae(v)
        if( !ptn_residual_eq0_flag[ k ] ) {
            ptn_residual_sign_flag[ k ]            ae(v)
            ptn_residual_abs_log2[ k ]             ae(v)
            ptn_residual_abs_remaining[ k ]        ae(v)
        }
    }
```

If the axis conversion is present, the component corresponds to laser index is not to be signaled.

Moreover, when num_lasers_minus1 is 1 (there are only two lasers), the residual can be either zero, −1 or +1, however, here for the nonzero case, the sign and subsequent information can be inferred and does not need to be signaled. For example, let say, we have two lasers, with laserIdx 0 and 1, then if the predicted laserIdx is 1, and residual is nonzero, then it can be inferred that the current laserIdx=0. So, in that case, just signaling ptn_residual_eq0_flag[2] is sufficient. Accordingly, the following changes in the syntax may be implemented:

```
<ADD> numComp = (geometry_angular_enabled_flag
&& !num_lasers_minus1)? 2 : 3 </ADD>
    for( k = 0; k < <REMOVE> 3 </REMOVE> <ADD>
    numComp </ADD>; k++ ) {
        ptn_residual_eq0_flag[ k ]                 ae(v)
        if( !ptn_residual_eq0_flag[ k ] <ADD>
            && !(k==2 && num_lasers_minus1
            == 1) </ADD>) {
            ptn_residual_sign_flag[ k ]            ae(v)
            ptn_residual_abs_log2[ k ]             ae(v)
            ptn_residual_abs_remaining[ k ]        ae(v)
        }
    }
```

As discussed above, in accordance with the fourth example, the encoder and/or decoder may modify zero prediction by utilizing the azimuth and laser index of parent neighbor, and sign inference.

Currently, zero prediction in the angular domain corresponds to all components equal to zero. However, the current implementation of zero prediction may be inefficient, and thusly is rarely used.

In accordance with one or more techniques of this disclosure, an encoder or decoder may inherit the azimuth and laser index from the parentNode (ancestors), if parentNode is available. So, in a way, similar to delta prediction, except radius is set to zero (or a minimum radius value).

The following changes in the position prediction process is needed (section 8.2.6.4) [w19522]:
#############################################
##############################
When predMode is equal to 0, the predicted point position is <REMOVE>0</REMOVE>:
for (k=0; k<3; k++) ( predPos[k]=0

<ADD>if(geometry_angular_enabled_flag && k)

predPos[k]=aPos0[k]</ADD>)

When predMode is equal to 1, the predicted point position is the position associated with the first ancestor.
for (k=0; k<3; k++)

predPos[k]=aPos0[k]

When predMode is equal to 2, the predicted point position is a linear combination of the positions associated with the first two ancestors for (k=0; k<3; k++)

predPos[k]=aPos0[k]+aPos0[k]–aPos1[k]

Otherwise, predMode is equal to 3, the predicted point position is a linear combination of the positions associated with all three ancestors
for (k=0; k<3; k++)

predPos[k]=aPos0[k]+aPos1[k]–aPos2[k]

##############################################
########################

Secondly, when zero predictor is used, as the predicted radius is zero, the corresponding residual is inferred to be positive, accordingly, the corresponding sign do not need to be signaled, but to be inferred. The same also holds when angular mode is disabled.

| | |
|---|---|
| for( k = 0; k < 3; k++ ) { | |
|   ptn_residual_eq0_flag[ k ] | ae(v) |
|   if( !ptn_residual_eq0_flag[ k ] ) { | |
|     <ADD> if(k || ptn_pred_mode[nodeIdx]) </ADD> | |
|       ptn_residual_sign_flag[ k ] | ae(v) |
|     ptn_residual_abs_log2[ k ] | ae(v) |
|     ptn_residual_abs_remaining[ k ] | ae(v) |
|   } | |
| } | |

Alternatively, the minimum value of radius (the minimum radius among all points) can be signaled in the slice header, which can be used as the radius for zero predictor instead of 0.

To improve the zero predictor, phi multiplier can be applied to all predictor, not just delta predictor. The following changes in the syntax are:

| | |
|---|---|
| if( geometry_angular_enabled_flag <REMOVE> && | |
| ptn_pred_mode [ nodeIdx ] = = 1 </REMOVE> ) { | |
|   ptn_phi_mult_eq0_flag | ae(v) |
|   if( !ptn_phi_mult_eq0_flag ) { | |
|     ptn_phi_mult_sign_flag | ae(v) |
|     ptn_phi_mult_eq1_flag | ae(v) |
|     if( !ptn_phi_mult_eq1_flag ) | |
|       ptn_phi_mult_abs_minus2 | ae(v) |
|     if( ptn_phi_mult_abs_minus2 = = 15 ) | |
|       ptn_phi_mult_abs_minus17 | ae(v) |
|   } | |
| } | |

Figure 6:
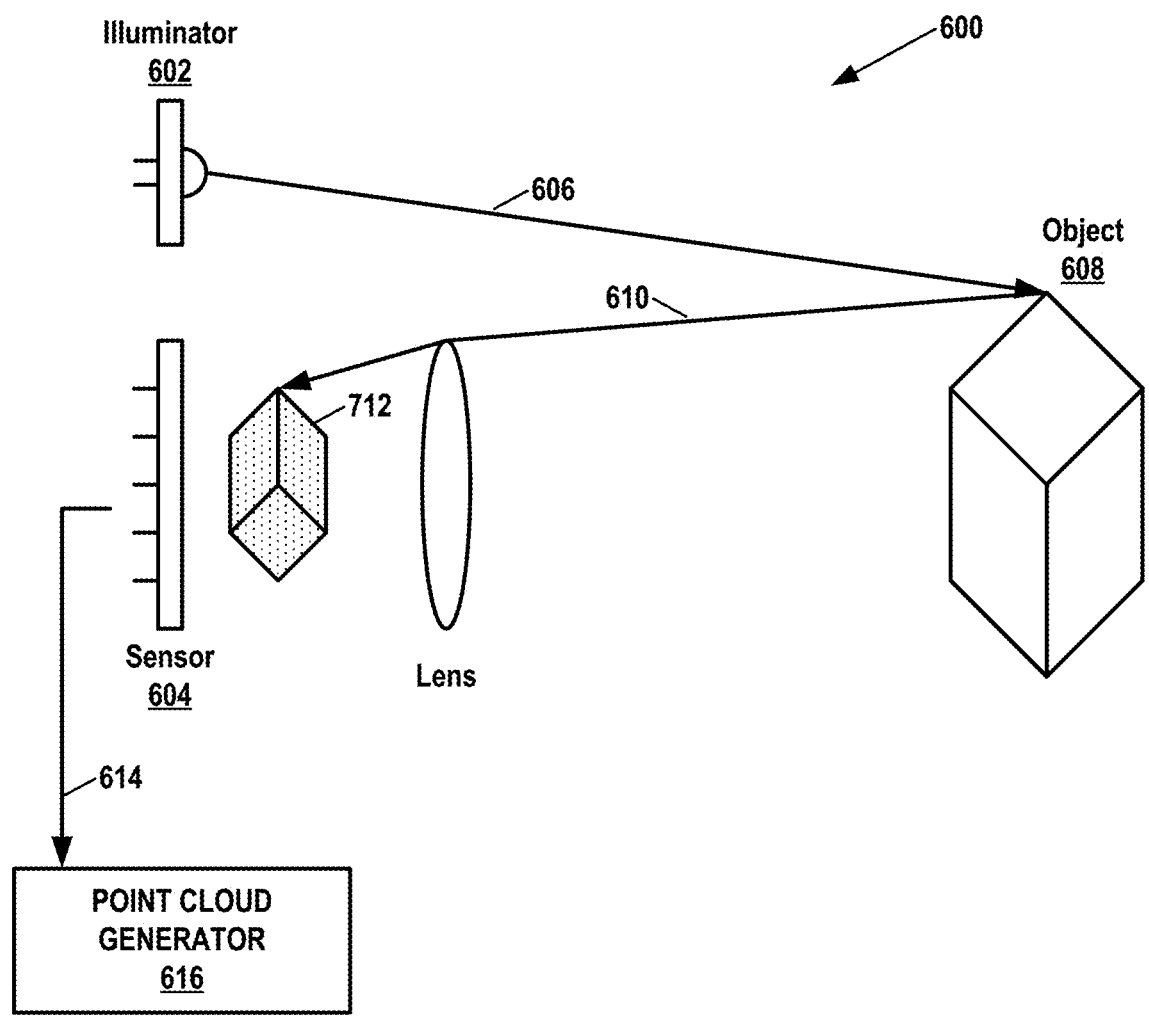
FIG. 6 is a conceptual diagram illustrating an example range-finding system that may be used with one or more techniques of this disclosure.

FIG. 6 is a conceptual diagram illustrating an example range-finding system 600 that may be used with one or more techniques of this disclosure. In the example of FIG. 6, range-finding system 600 includes an illuminator 602 and a sensor 604. Illuminator 602 may emit light 606. In some examples, illuminator 602 may emit light 606 as one or more laser beams. Light 606 may be in one or more wavelengths, such as an infrared wavelength or a visible light wavelength. In other examples, light 606 is not coherent, laser light. When light 606 encounters an object, such as object 608, light 606 creates returning light 610. Returning light 610 may include backscattered and/or reflected. light. Returning light 610 may pass through a lens 611 that directs returning light 610 to create an image 612 of object 608 on sensor 604. Sensor 604 generates signals 614 based on image 612. Image 612 may comprise a set of points (e.g., as represented by dots in image 612 of FIG. 6).

In some examples, illuminator 602 and sensor 604 may be mounted on a spinning structure so that illuminator 602 and sensor 604 capture a 360-degree view of an environment. In other examples, range-finding system 600 may include one or more optical components (e.g., mirrors, collimators, diffraction gratings, etc.) that enable illuminator 602 and sensor 604 to detect ranges of objects within a specific range (e.g., up to 360-degrees). Although the example of FIG. 6 only shows a single illuminator 602 and sensor 604, range-finding system 600 may include multiple sets of illuminators and sensors.

In some examples, illuminator 602 generates a structured light pattern. In such examples, range-finding system 600 may include multiple sensors 604 upon which respective images of the structured light pattern are formed. Range-finding system 600 may use disparities between the images of the structured light pattern to determine a distance to an object 608 from which the structured light pattern backscatters. Structured light-based range-finding systems may have a high level of accuracy (e.g., accuracy in the sub-millimeter range), when object 608 is relatively close to sensor 604 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 600 is a time of flight (ToF)-based system. In some examples where range-finding system 600 is a ToF-based system, illuminator 602 generates pulses of light. In other words, illuminator 602 may modulate the amplitude of emitted light 606. In such examples, sensor 604 detects returning light 610 from the pulses of light 606 generated by illuminator 602. Range-finding system 600 may then determine a distance to object 608 from which light 606 backscatters based on a delay between when light 606 was emitted and detected and the known speed of light in air). In some examples, rather than (or in addition to) modulating the amplitude of the emitted light 606, illuminator 602 may modulate the phase of the emitted light 606. In such examples, sensor 604 may detect the phase of returning light 610 from object 608 and determine distances to points on object 608 using the speed of light and based on time differences between when illuminator 602 generated light 606 at a specific phase and when sensor 604 detected returning light 610 at the specific phase.

In other examples, a point cloud may be generated without using illuminator 602. For instance, in some examples, sensors 604 of range-finding system 600 may include two or more optical cameras. In such examples, range-finding system 600 may use the optical cameras to capture stereo images of the environment, including object 608. Range-finding system 600 may include a point cloud generator 616 that may calculate the disparities between locations in the stereo images. Range-finding system 600 may then use the disparities to determine distances to the locations shown in the stereo images. From these distances, point cloud generator 616 may generate a point cloud.

Sensors 604 may also detect other attributes of object 608, such as color and reflectance information. In the example of FIG. 6, a point cloud generator 616 may generate a point cloud based on signals 614 generated by sensor 604. Range-finding system 600 and/or point cloud generator 616 may form part of data source 104 (FIG. 1). Hence, a point cloud generated by range-finding system 600 may be encoded and/or decoded according to any of the techniques of this disclosure.

Figure 7:
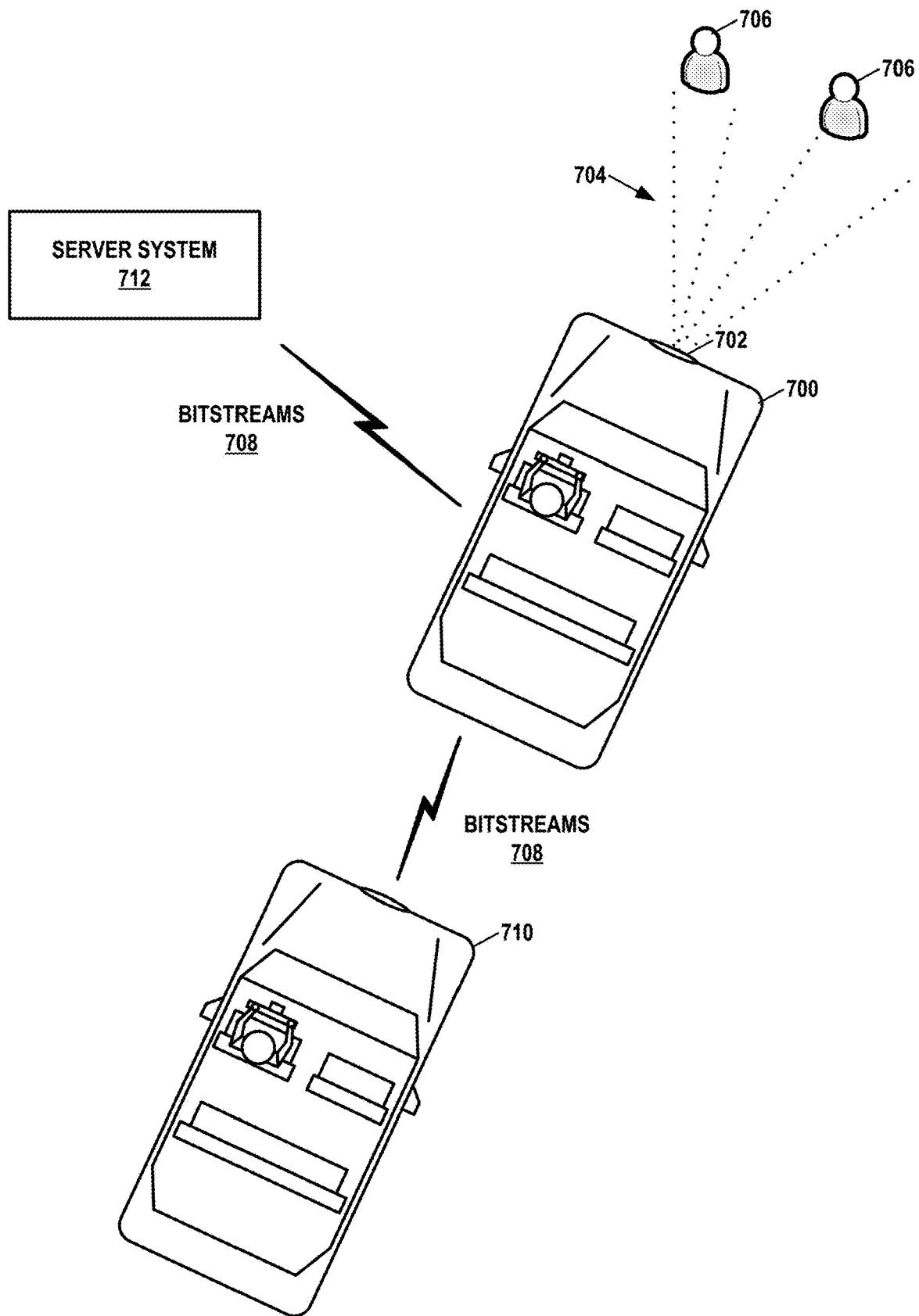
FIG. 7 is a conceptual diagram illustrating an example vehicle-based scenario in which one or more techniques of this disclosure may be used.

FIG. 7 is a conceptual diagram illustrating an example vehicle-based scenario in which one or more techniques of this disclosure may be used. In the example of FIG. 7, a vehicle 700 includes a range-finding system 702. Range-finding system 702 may be implemented in the manner discussed with respect to FIG. 7. Although not shown in the example of FIG. 7, vehicle 700 may also include a data source, such as data source 104 (FIG. 1), and a G-PCC encoder, such as G-PCC encoder 200 (FIG. 1). In the example of FIG. 7, range-finding system 702 emits laser beams 704 that reflect off pedestrians 706 or other objects in a roadway. The data source of vehicle 700 may generate a point cloud based on signals generated by range-finding system 702. The G-PCC encoder of vehicle 700 may encode the point cloud to generate bitstreams 708, such as geometry bitstream (FIG. 2) and attribute bitstream (FIG. 2). Bitstreams 708 may include many fewer bits than the unencoded point cloud obtained by the G-PCC encoder.

An output interface of vehicle 700 (e.g., output interface 108 (FIG. 1) may transmit bitstreams 708 to one or more other devices. Bitstreams 808 may include many fewer bits than the unencoded point cloud obtained by the G-PCC encoder. Thus, vehicle 700 may be able to transmit bitstreams 708 to other devices more quickly than the unencoded point cloud data. Additionally, bitstreams 708 may require less data storage capacity.

In the example of FIG. 7, vehicle 700 may transmit bitstreams 708 to another vehicle 710. Vehicle 710 may include a G-PCC decoder, such as G-PCC decoder 300 (FIG. 1). The G-PCC decoder of vehicle 710 may decode bitstreams 708 to reconstruct the point cloud. Vehicle 710 may use the reconstructed point cloud for various purposes. For instance, vehicle 710 may determine based on the reconstructed point cloud that pedestrians 706 are in the roadway ahead of vehicle 700 and therefore start slowing down, e.g., even before a driver of vehicle 710 realizes that pedestrians 706 are in the roadway. Thus, in some examples, vehicle 710 may perform an autonomous navigation operation based on the reconstructed point cloud.

Additionally or alternatively, vehicle 700 may transmit bitstreams 708 to a server system 712. Server system 712 may use bitstreams 708 for various purposes. For example, server system 712 may store bitstreams 708 for subsequent reconstruction of the point clouds. In this example, server system 712 may use the point clouds along with other data (e.g., vehicle telemetry data generated by vehicle 700) to train an autonomous driving system. In other example, server system 712 may store bitstreams 708 for subsequent reconstruction for forensic crash investigations (e.g., if vehicle 700 collides with pedestrians 706).

Figure 8:
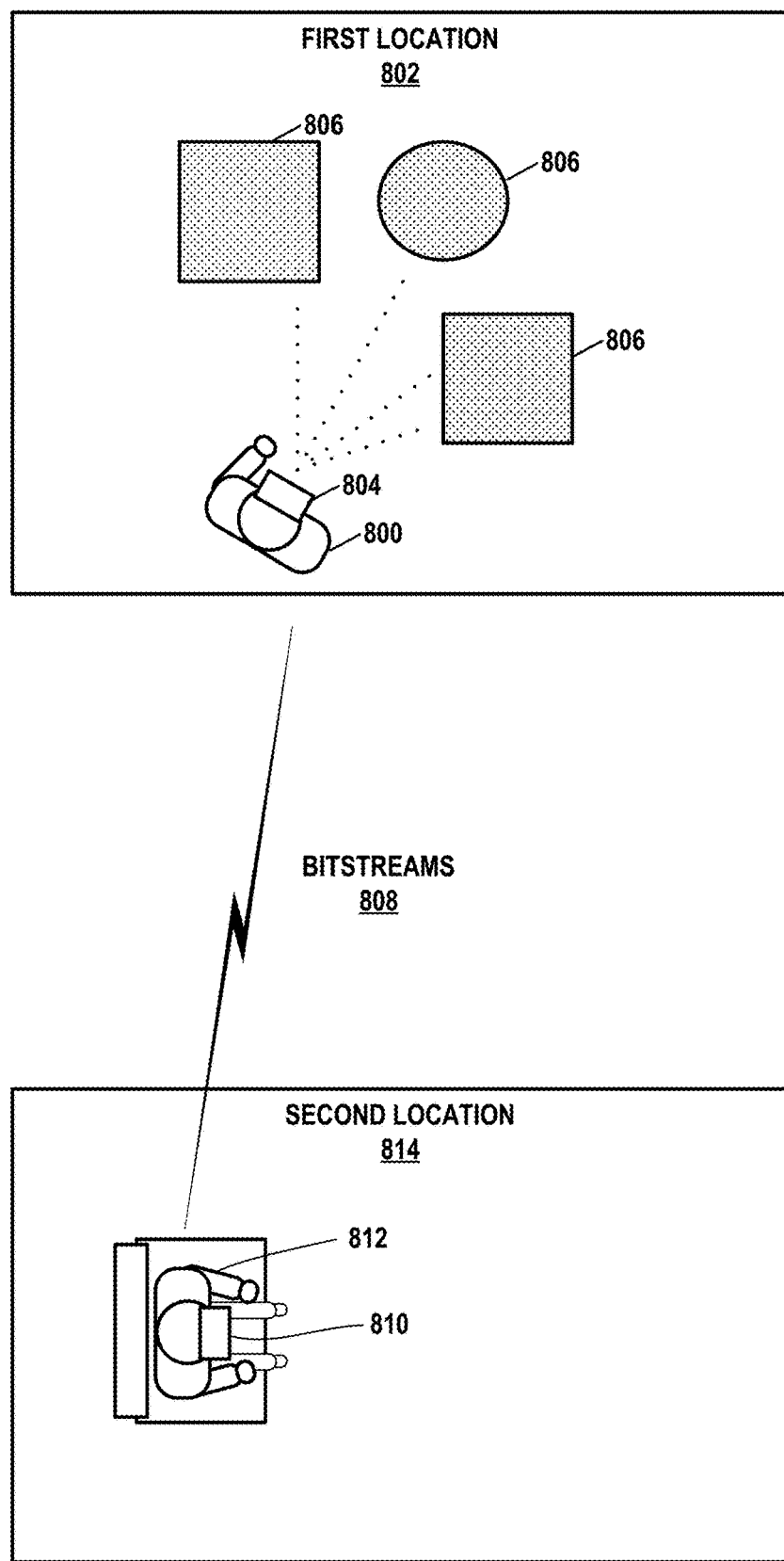
FIG. 8 is a conceptual diagram illustrating an example extended reality system in which one or more techniques of this disclosure may be used.

FIG. 8 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 8, a user 800 is located in a first location 802. User 800 wears an XR headset 804. As an alternative to XR headset 804, user 800 may use a mobile device (e.g., mobile phone, tablet computer, etc.). XR headset 804 includes a depth detection sensor, such as a range-finding system, that detects positions of points on objects 806 at location 802. A data source of XR headset 804 may use the signals generated by the depth detection sensor to generate a point cloud representation of objects 806 at location 802. XR headset 804 may include a G-PCC encoder (e.g., G-PCC encoder 200 of FIG. 1) that is configured to encode the point cloud to generate bitstreams 808.

XR headset 804 may transmit bitstreams 808 (e.g., via a network such as the Internet) to an XR headset 810 worn by a user 812 at a second location 814. XR headset 810 may decode bitstreams 808 to reconstruct the point cloud. XR headset 810 may use the point cloud to generate an XR visualization (e.g., an AR, MR, VR visualization) representing objects 806 at location 802. Thus, in some examples, such as when XR headset 810 generates an VR visualization, user 812 may have a 3D immersive experience of location 802. In some examples, XR headset 810 may determine a position of a virtual object based on the reconstructed point cloud. For instance, XR headset 810 may determine, based on the reconstructed point cloud, that an environment (e.g., location 802) includes a flat surface and then determine that a virtual object (e.g., a cartoon character) is to be positioned on the flat surface. XR headset 810 may generate an XR visualization in which the virtual object is at the determined position. For instance, XR headset 810 may show the cartoon character sitting on the flat surface.

Figure 9:
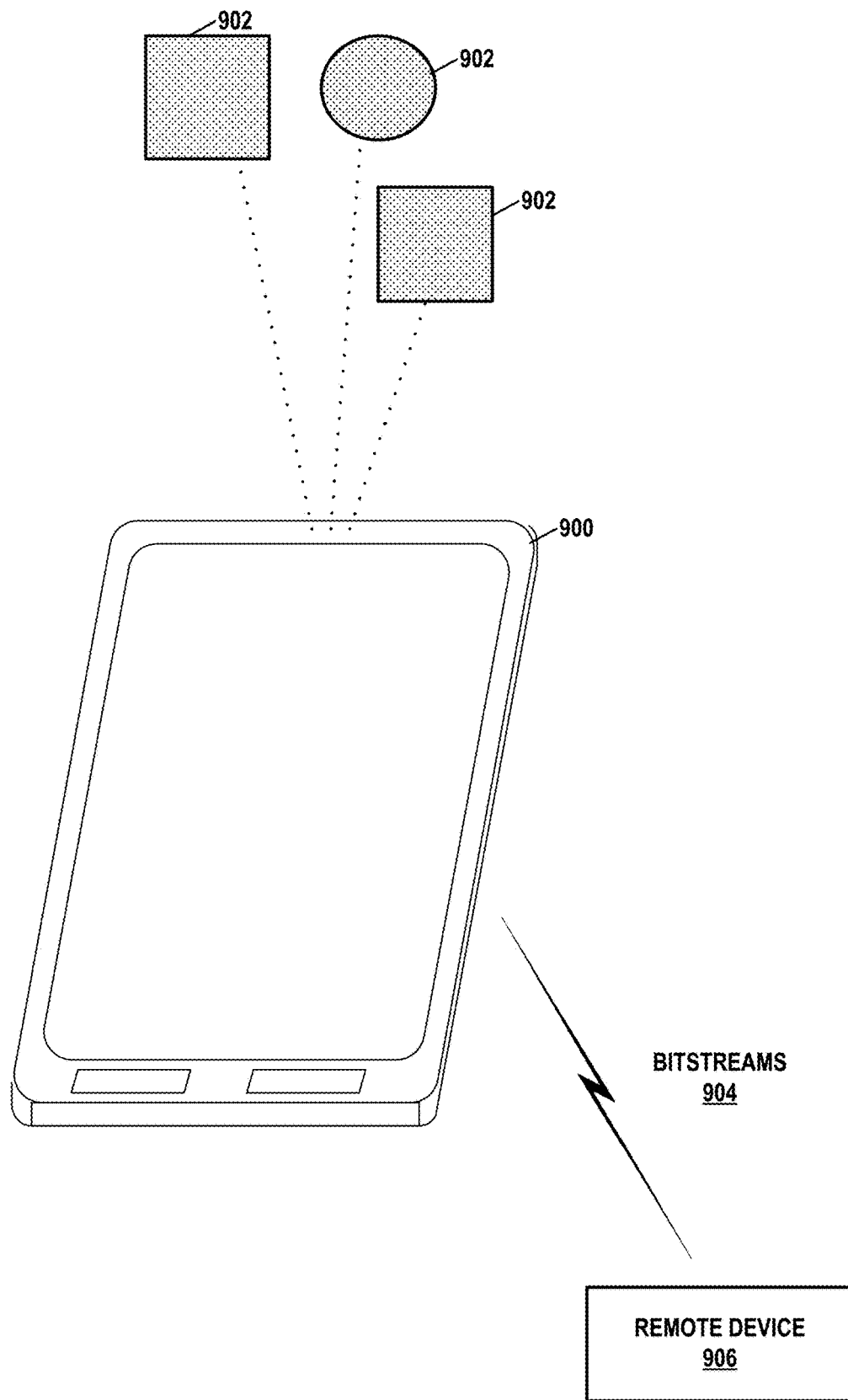
FIG. 9 is a conceptual diagram illustrating an example mobile device system in which one or more techniques of this disclosure may be used.

FIG. 9 is a conceptual diagram illustrating an example mobile device system in which one or more techniques of this disclosure may be used. In the example of FIG. 9, a mobile device 900, such as a mobile phone or tablet computer, includes a range-finding system, such as a LIDAR system, that detects positions of points on objects 902 in an environment of mobile device 900. A data source of mobile device 900 may use the signals generated by the depth detection sensor to generate a point cloud representation of objects 902. Mobile device 900 may include a G-PCC encoder (e.g., G-PCC encoder 200 of FIG. 1) that is configured to encode the point cloud to generate bitstreams 904. In the example of FIG. 9, mobile device 900 may transmit bitstreams to a remote device 906, such as a server system or other mobile device. Remote device 906 may decode bitstreams 904 to reconstruct the point cloud. Remote device 906 may use the point cloud for various purposes. For example, remote device 906 may use the point cloud to generate a map of environment of mobile device 900. For instance, remote device 906 may generate a map of an interior of a building based on the reconstructed point cloud. In another example, remote device 906 may generate imagery (e.g., computer graphics) based on the point cloud. For instance, remote device 906 may use points of the point cloud as vertices of polygons and use color attributes of the points as the basis for shading the polygons. In some examples, remote device 906 may use the reconstructed point cloud for facial recognition or other security applications.

Figure 10A:
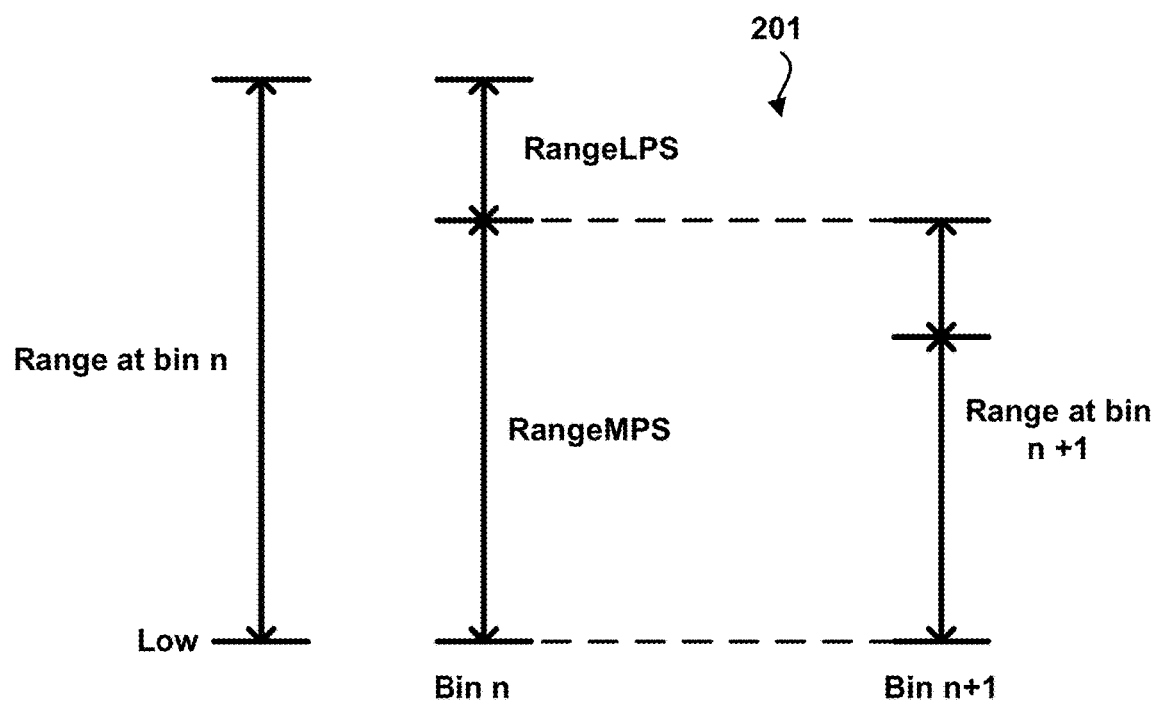
FIGS. 10A and 10B are conceptual diagrams illustrating a range update process in binary arithmetic coding.
Figure 10B:
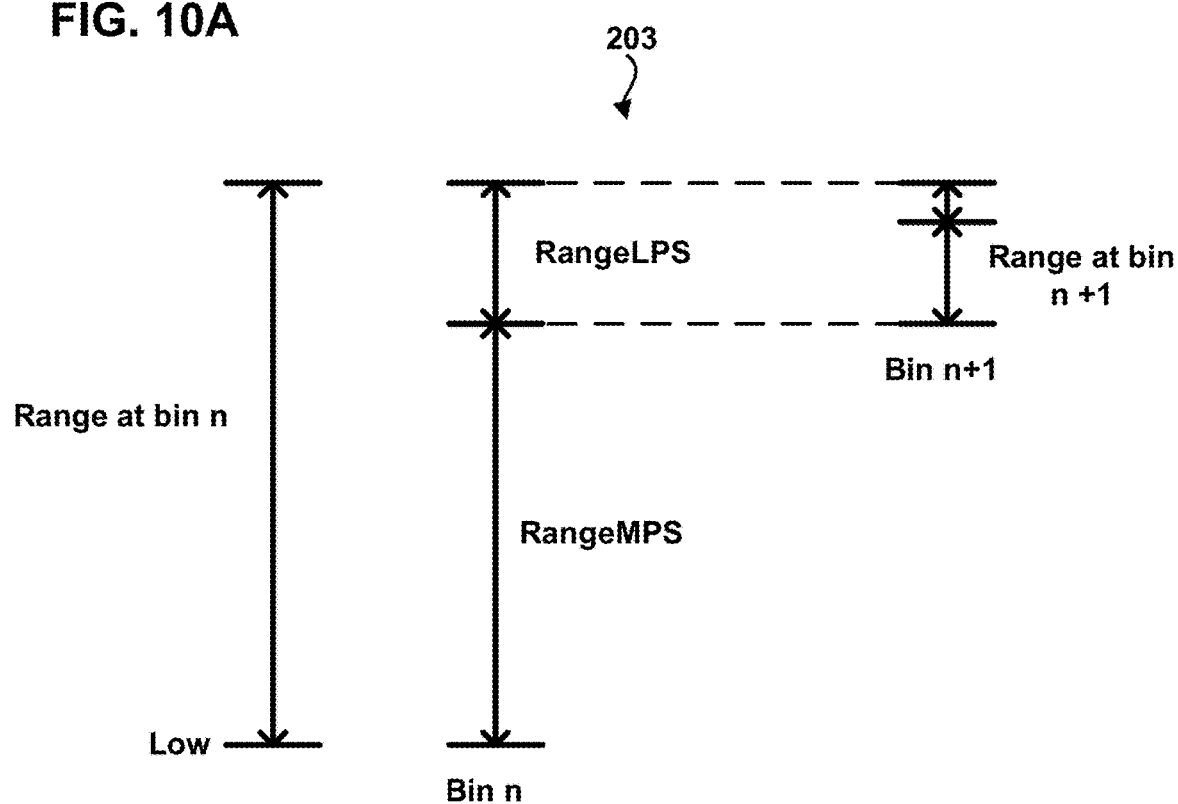

FIGS. 10A and 10B show examples of this process at bin n. In example 201 of FIG. 10A, the range at bin n includes the RangeMPS and RangeLPS given by the probability of the LPS ($p_\sigma$) given a certain context state ($\sigma$). Example 201 shows the update of the range at bin n+1 when the value of bin n is equal to the MPS. In this example, the low stays the same, but the value of the range at bin n+1 is reduced to the value of RangeMPS at bin n. Example 203 of FIG. 10B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 11:
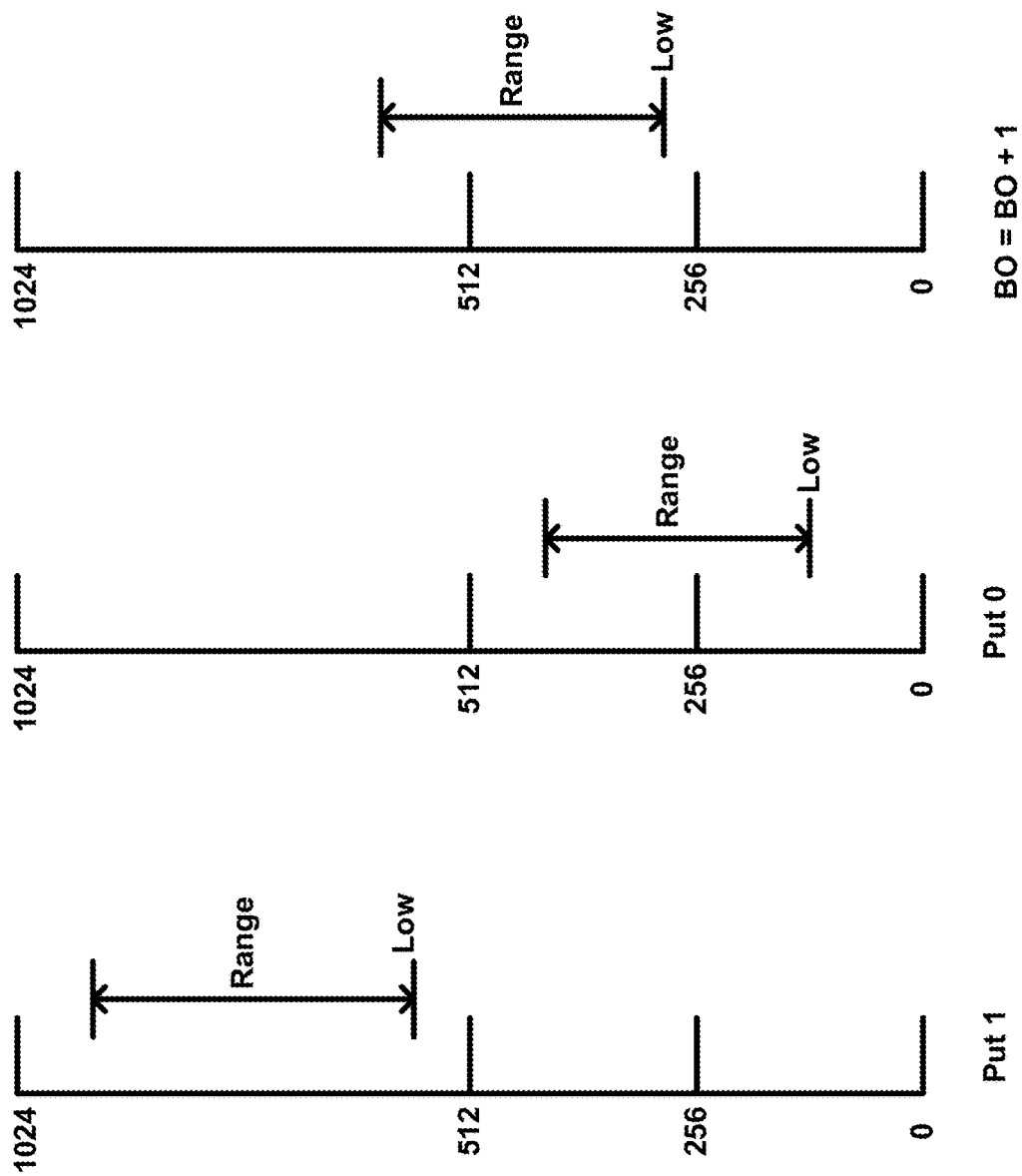
FIG. 11 is a conceptual diagram illustrating an output process in binary arithmetic coding.

In some examples, the range may be expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the BAC outputs to the bitstream, a '0,' or a '1,' or updates an internal variable (called BO: bits-outstanding) to keep for future outputs. FIG. 11 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

As discussed above, arithmetic coding methods may be used to provide high compression efficiency. This is achieved by first transforming the non-binary syntax elements into a binary representation (e.g., 0, 1) using a process called binarization. The resulting transformed entries are called as bins or bin-strings. These bins or bin strings are then fed into the arithmetic coding process. FIG. 11 illustrates an example context adaptive binary arithmetic coding (CABAC) encoding stage. The example CABAC encoding stage may be implemented in a G-PCC encoder, such as by arithmetic encoding unit 214 and/or arithmetic encoding unit 226 of G-PCC encoder 200 of FIG. 2.

In some examples of G-PCC, context-adaptive binary arithmetic coding (CABAC) may be used for generating the bins through the binarization process. For each coded bin value, an appropriate context model is selected. These context models are used for encoding each bin value into output bits based on the bin probability values. CABAC engine bypasses context-modeling and bin encoding when the bin is equally probable to be 0 or 1. This is the bypass coding stage discussed below. Otherwise, an appropriate context model is specified as the bin values are encoded and models based on the probability of bin-values. Contexts are adapted as the encoder encodes more bins. Lastly, the context-coded bin values or raw bitstreams are transmitted or otherwise provided to the decoder.

Figure 12:
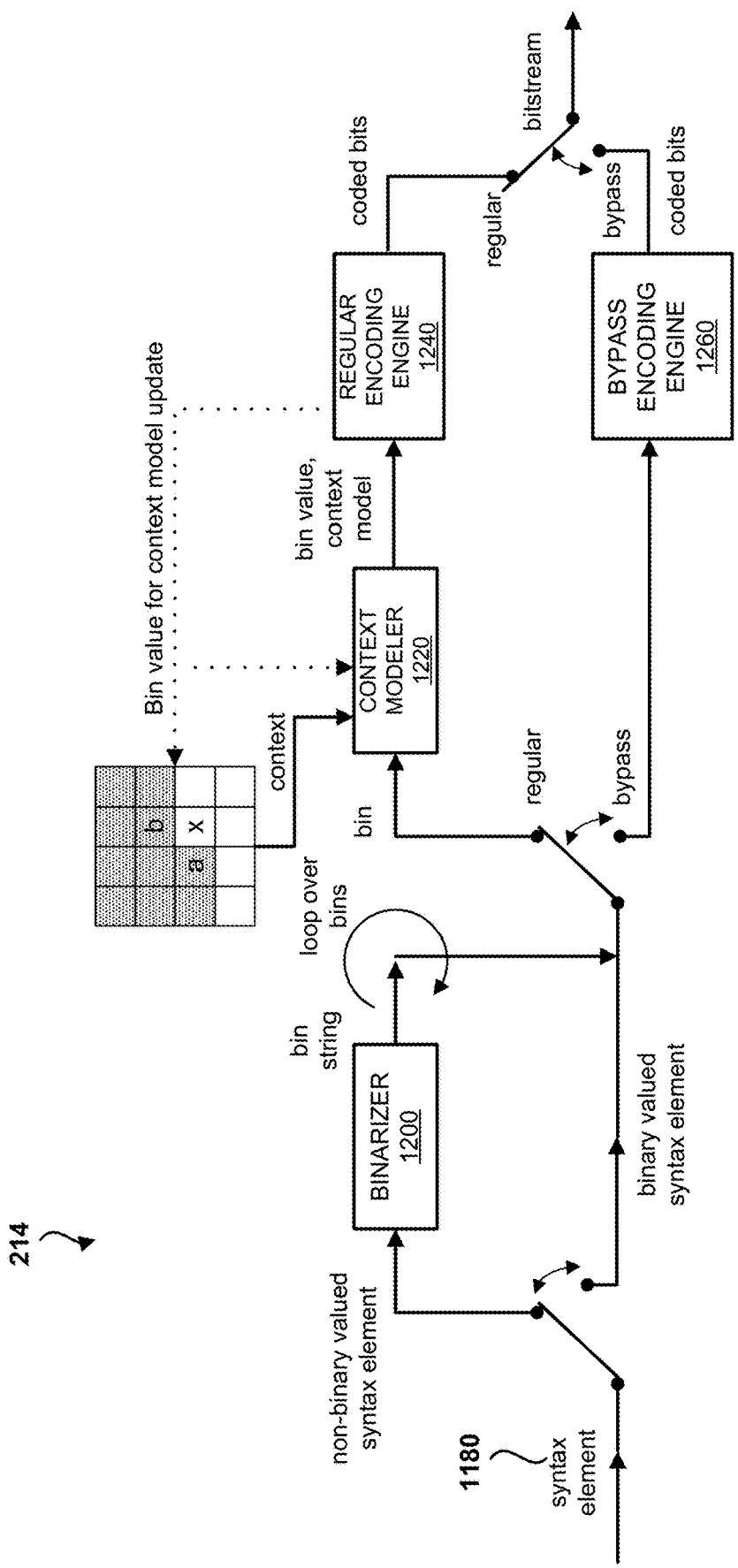
FIG. 12 is a block diagram illustrating a context adaptive binary arithmetic coder in a G-PCC encoder.

FIG. 12 is a block diagram of an example arithmetic encoding unit 214 that may be configured to perform CABAC in accordance with the techniques of this disclosure. A syntax element 1180 is input into the arithmetic encoding unit 214. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 1200. Binarizer 1200 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 1200 is fed to the binary arithmetic coding side of arithmetic encoding unit 214. That is, for a predetermined set of non-binary valued syntax elements, each bin type (e.g., bin 0) is coded before the next bin type (e.g., bin 1). Coding may be performed in either regular mode or bypass mode. In bypass mode, bypass encoding engine 1260 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 1220. Context modeler 1220 outputs the bin value and the probability state for the context (e.g., the probability state σ, including the value of the LPS and the probability of the LPS occurring). The context may be an initial context for a series of bins, or may be determined based on the coded values of previously coded bins. The identify of a context may be expressed and/or be determined based on a value of a variable ctxInc (context increment, such as the value of the ctxInc representing an increment to apply to a previous context). As described above, context modeler 1220 may update the state based on whether or not the received bin was the MPS or the LPS. After the context and probability state σ is determined by context modeler 1220, regular encoding engine 1240 performs BAC on the bin value.

Figure 13:
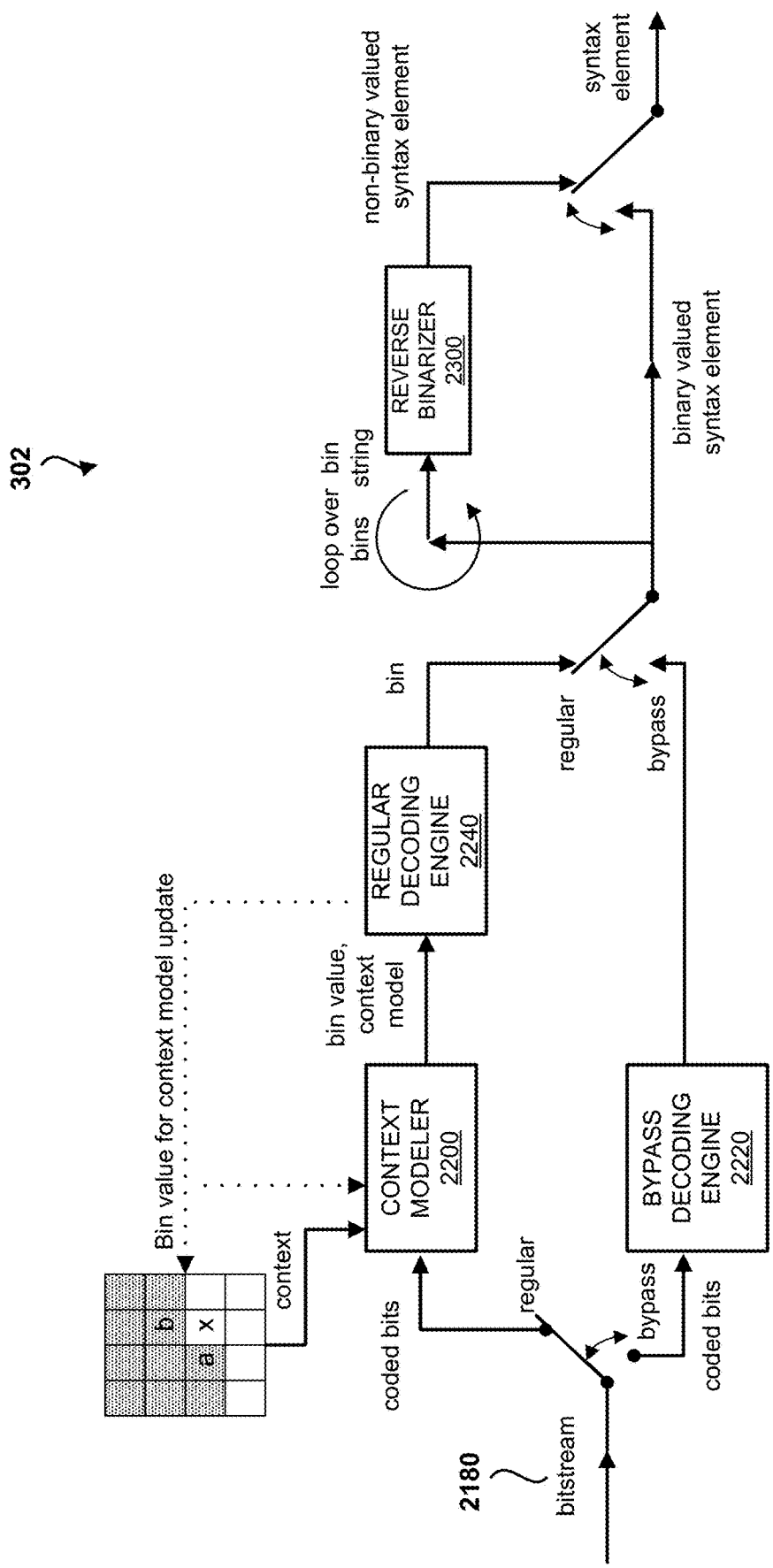
FIG. 13 is a block diagram illustrating a context adaptive binary arithmetic coder in a G-PCC decoder.

FIG. 13 is a block diagram of an example arithmetic decoding unit 302 that may be configured to perform CABAC in accordance with the techniques of this disclosure. The arithmetic decoding unit 302 of FIG. 13 performs CABAC in an inverse manner as that of arithmetic encoding unit 214 described in FIG. 12. Coded bits from bitstream 2180 are input into arithmetic decoding unit 302. The coded bits are fed to either context modeler 2200 or bypass decoding engine 2220 based on whether they were entropy coded using regular mode or bypass mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 2200 may determine a probability model for the coded bits and regular decoding engine 2240 may decode the coded bits to produce bins of non-binary valued syntax elements (or the syntax elements themselves if binary-valued). After the context and probability state σ is determined by context modeler 2200, regular decoding engine 2240 performs BAC to decode the bin value. In other words, regular decoding engine 2240 may determine a probability state of a context, and decode a bin value based on previously coded bins and a current range. After decoding the bin, context modeler 2200 may update the probability state of the context based on the window size and the value of the decoded bin.

Figure 14:
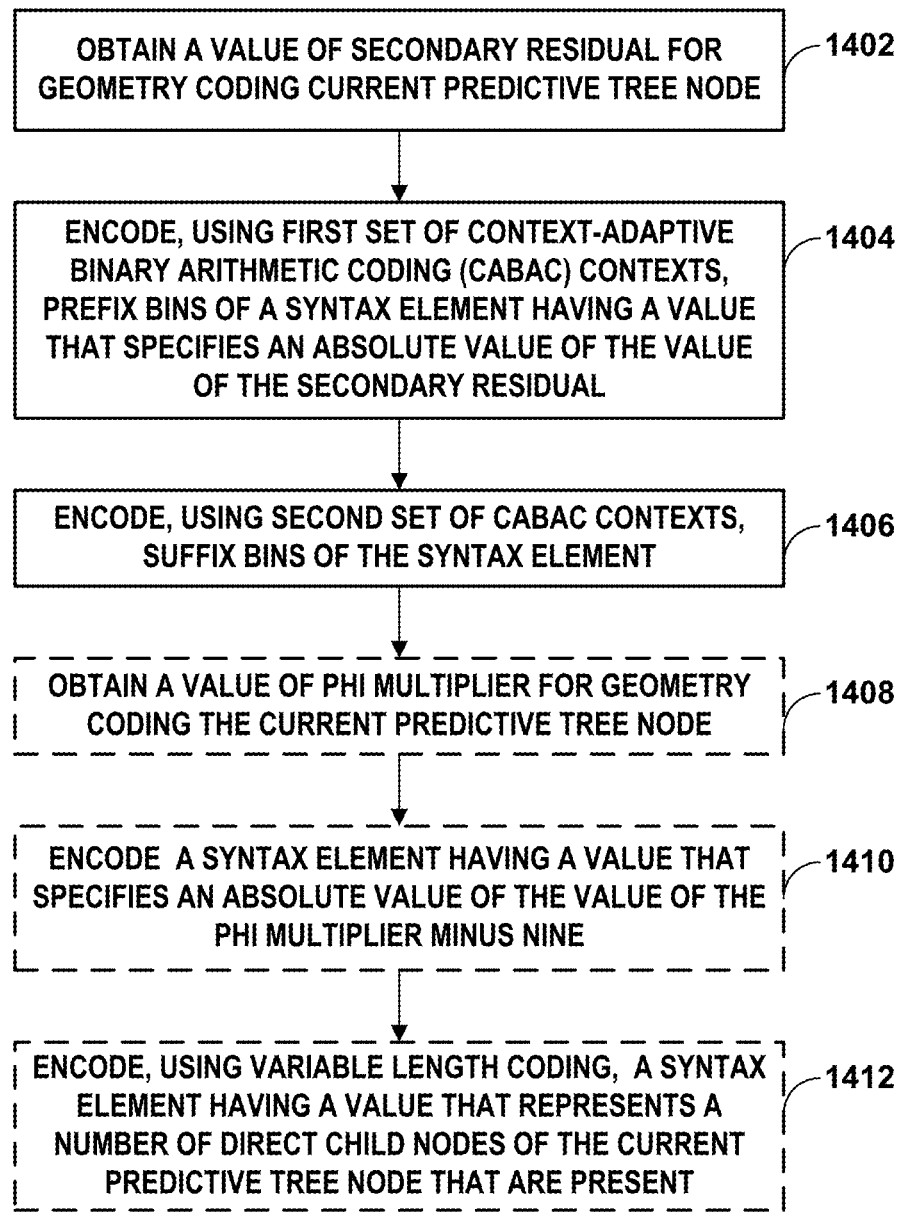
FIG. 14 is a flow diagram illustrating an example technique for processing a point cloud, in accordance with one or more techniques of this disclosure.

FIG. 14 is a flowchart illustrating an example method for encoding a current predictive tree node, in accordance with one or more techniques of this disclosure. The current predictive tree node (PTN) may be included in a point cloud. Although described with respect to G-PCC encoder 200 (FIGS. 1 and 2), it should be understood that other devices may be configured to perform a method similar to that of FIG. 14. For instance, a G-PCC decoder, such as G-PCC decoder 300 (FIGS. 1 and 3) may perform a complimentary method to that of FIG. 14 (e.g., decode as opposed to encode).

G-PCC encoder 200 may obtain a value of a secondary residual for geometry coding a current predictive tree node (PTN) of the point cloud (1402). As discussed above, when using an angular mode for predictive geometry coding in G-PCC, G-PCC encoder 200 may perform prediction in the (r, φ, i) domain. Due to the errors in rounding, coding in r, φ, i may be lossy. In some examples, this loss may by reduced or eliminated by coding a second set of residuals (referred to as secondary residuals), which may be in a Cartesian domain. For instance, the current PTN may include three secondary residuals ($r_x$, $r_y$, $r_z$), one or more of which may be encoded using the technique of FIG. 14.

G-PCC encoder 200 may encode the value of the secondary residual. To encode the value of the secondary residual. G-PCC encoder 200 may encode, using a first set of context-adaptive binary arithmetic coding (CABAC) contexts, prefix bins of a syntax element having a value that specifies an absolute value of the value of the secondary residual minus 2 (1404); and encode, using a second set of CABAC contexts that is different than the first set of contexts, suffix bins of the syntax element (1406). For instance, arithmetic encoding unit 214 of G-PCC encoder 200 may encode prefix bins of a ptn_sec_residual_abs_minus2 syntax element using contexts with context indices (ctxIdx) between 0 and a−1 and encode suffix bins of the ptn_sec_residual_abs_minus2[k] syntax element using contexts with context indices (ctxIdx) between a and a+b−1. In some examples, a may be 5 and b may be 4.

In some examples, in addition to the syntax element having a value that specifies an absolute value of the value of the secondary residual minus 2, G-PCC encoder 200 may encode one or more other syntax elements that specify the value of the secondary residual. As one example, G-PCC encoder 200 may encode a syntax element having a value that specifies whether the value of the secondary residual is equal to zero (e.g., ptn_sec_residual_eq0_flag). As another example, where the value of the secondary residual is not equal to zero, G-PCC encoder 200 may encode a syntax element having a value that specifies a sign of the value of the secondary residual (e.g., ptn_sec_residual_sign_flag), and a syntax element having a value that specifies whether the value of the secondary residual is greater than one (e.g., ptn_sec_residual_eq1_flag).

However, as discussed above an in accordance with one or more techniques of this disclosure, G-PCC encoder 200 may avoid encoding a syntax element that specifies the absolute value of the secondary residual minus 17 (e.g., ptn_sec_residual_abs_minus17) even where the absolute value of the secondary residual is greater than 17. By not encoding the syntax element that specifies the absolute value of the secondary residual minus 17 and by context coding the prefix and suffix of the syntax element that specifies the absolute value of the secondary residual minus 2, G-PCC encoder 200 may reduce the number of contexts and/or context coded bins used to signal secondary residuals. As such, the techniques of this disclosure may reduce computational complexity of point cloud coding.

The techniques of this disclosure may be applicable to signaling beyond secondary residuals. For instance, G-PCC encoder 200 may obtain a value of a phi multiplier for geometry coding the current predictive tree node of the point cloud (1408) and encode the value of the phi multiplier by at least encoding a syntax element having a value that specifies an absolute value of the value of the phi multiplier minus 9 (e.g., ptn_phi_mult_abs_minus9) (1410). However, similar to the secondary residual, G-PCC encoder 200 may avoid encoding a syntax element that specifies the absolute value of the phi multiplier minus 17 (e.g., even where the absolute value of the phi multiplier is greater than 17).

As discussed above, in some examples, a G-PCC encoder may signal a number of direct child nodes of PTNs. For instance, G-PCC encoder 200 may encode a syntax element that represents a number of direct child nodes of the current predictive tree node that are present in a geometry predictive tree that represents the point cloud (e.g., Ptn_child_cnt). In some examples, G-PCC encoder 200 may utilize fixed length coding for encoding the syntax element (e.g., binarizing). For instance, G-PCC encoder 200 may utilize the following table to encode the syntax element that represents the number of direct child nodes.

| Number of Child | Ptn_child_cnt |
| --- | --- |
| 0 | 00 |
| 1 | 01 |
| 2 | 10 |
| 3 | 11 |

However, in some examples, utilizing fixed length coding may be undesirable. For instance, a probability distribution of the number of child nodes may result in more PTNs have one child node than having 0, 2, or 3 child nodes. In accordance with one or more techniques of this disclosure, G-PCC encoder 200 may encode, using variable length coding, the syntax element that represents a number of direct child nodes of the current predictive tree node that are present in a geometry predictive tree that represents the point cloud (e.g., Ptn_child_cnt) (1412). For instance, G-PCC encoder 200 may utilize the following table to encode the syntax element that represents the number of direct child nodes.

| Number of Child | Ptn_child_cnt |
| --- | --- |
| 0 | 10 |
| 1 | 0 |
| 2 | 110 |
| 3 | 111 |

As can be seen in the above table, variable length coding the syntax element that represents the number of direct child nodes may include utilizing a shorter codeword where the number of direct child nodes is 1 than where the number of direct child nodes is 0 (e.g., using the code word "0" where the number of child nodes is 1 vs using the code word "10" where the number of direct child nodes is 0).

Figure 15:
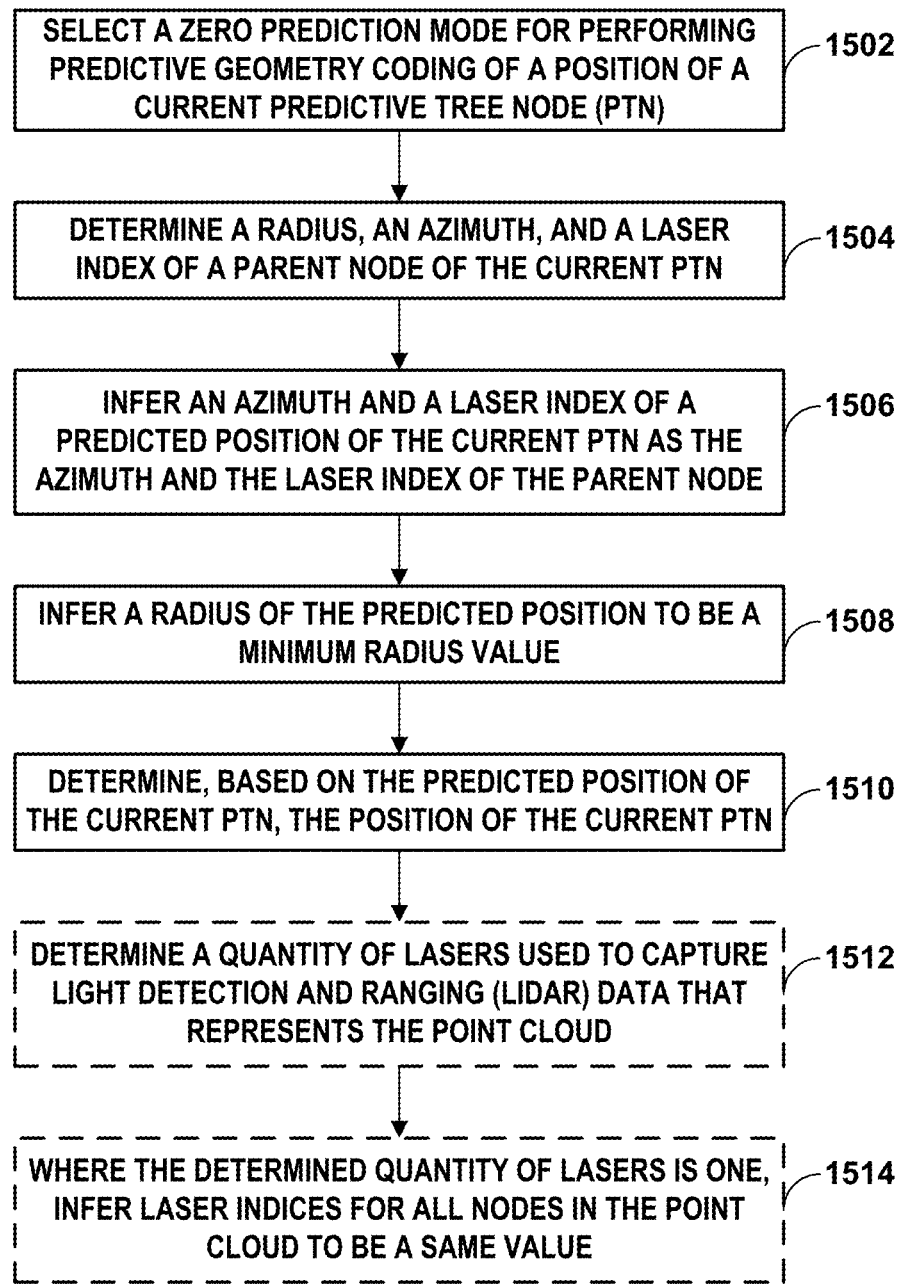
FIG. 15 is a flow diagram illustrating an example technique for processing a point cloud, in accordance with one or more techniques of this disclosure.

FIG. 15 is a flowchart illustrating an example method for decoding a current predictive tree node, in accordance with one or more techniques of this disclosure. The current predictive tree node (PTN) may be included in a point cloud. Although described with respect to G-PCC decoder 300 (FIGS. 1 and 3), it should be understood that other devices may be configured to perform a method similar to that of FIG. 15. For instance, a G-PCC encoder, such as G-PCC encoder 200 (FIGS. 1 and 2) may perform a complimentary method to that of FIG. 15 (e.g., encode as opposed to decode, such as in a reconstruction loop performed by GRU 216).

G-PCC decoder 300 may select, from a plurality of predefined prediction modes, a prediction mode for performing predictive geometry coding of a position of a current predictive tree node of the point cloud. As discussed above, the plurality of prediction modes may include at least: a zero prediction mode, and a delta prediction mode. In some examples, G-PCC decoder 300 may select the prediction mode based on a value of a syntax element. For instance, geometry arithmetic decoder unit 302) may decode a ptn_pred_mode syntax element having a value that specifies which prediction mode is to be selected.

Responsive to selecting the zero prediction mode (1502), G-PCC decoder 300 may perform zero prediction to determine the position of the current PTN. To perform zero prediction, G-PCC decoder 300 may determine a radius, an azimuth, and a laser index of a parent node of the current predictive tree node (1504). For instance, G-PCC decoder 300 may obtain the radius, azimuth, and laser index of the parent node front memory (e.g., as previously determined by G-PCC decoder 300).

G-PCC decoder 300 may infer an azimuth and a laser index of a predicted position of the current predictive tree node as the azimuth and the laser index of the parent node (1506). For instance, G-PCC decoder 300 may copy the azimuth and laser index of the parent node to as the azimuth and laser index of the predicted position of the current node.

G-PCC decoder 300 may infer a radius of the predicted position to be a minimum radius value (1508). For instance, G-PCC decoder 300 may always set the radius of the predicted position to be the minimum radius value. In some examples, the minimum radius value may always be zero. In some examples, the minimum radius value may be greater than zero. For instance, G-PCC decoder 300 may decode a syntax element that specifies the minimum radius value (e.g., from a slice header).

To complete performance of zero prediction, G-PCC decoder 300 may determine, based on the predicted position of the current predictive tree node, the position of the current predictive tree node (1510). For instance, G-PCC decoder 300 may obtain a residual radius value that represents a difference between a value of the radius of the predicted position of the current predictive tree node and a value of the radius of the position of the current predictive tree node. In some examples, such as where the selected mode is the zero prediction mode, G-PCC decoder 300 may infer that a sign of the residual radius value is positive (e.g., and avoid having to signal whether the sign is positive or negative). G-PCC decoder 300 may add the residual radius value to the minimum radius value (e.g., the radius value of the predicted position of the current PTN) to obtain the value of the radius of the position of the current PTN. G-PCC decoder 300 may similarly obtain and add residuals for other components (e.g., azimuth and laser index).

In some examples, G-PCC decoder 300 may modify decoding based on a quantity of lasers used to generate the point cloud. For instance, G-PCC decoder 300 may determine a quantity of lasers used to capture light detection and ranging (LIDAR) data that represents the point cloud (1512); and responsive to determining that the quantity of lasers is one, inferring laser indices for all nodes in the point cloud to be a same value (e.g., a laser index value of 0) (1514). In this way, G-PCC decoder 300 may avoid having to signal and/or predict laser indices. As such, the techniques of this disclosure may reduce the number of bits needed to represent point clouds and/or reduce point cloud coding complexity.

The following numbered clauses may illustrate one or more aspects of this disclosure:

Clause 1A. A method of processing a point cloud, the method comprising: obtaining a value of a secondary residual for geometry coding of the point cloud, the value being greater than 17; and coding the value of the secondary residual without coding a syntax element that specifies the value of the secondary residual minus 17.

Clause 2A. The method of clause 1A, wherein the syntax element comprises a ptn_sec_residual_abs_minus17 syntax element.

Clause 3A. The method of clause 1A or 2A, further comprising: obtaining a value of a phi multiplier for geometry coding of the point cloud, the value of the phi multiplier being greater than 17; and coding the value of the phi multiplier without coding a syntax element that specifies the value of the phi multiplier minus 17.

Clause 4A. The method of clause 3A, wherein the syntax element that specifies the value of the phi multiplier minus 17 comprises a ptn_phi_mult_abs_minus17 syntax element Clause 5A. The method of clause 3A or clause 4A, further comprising: coding a syntax element that specifies the value of the phi multiplier minus 9.

Clause 6A. The method of any of clauses 1A-5A, wherein coding the value of the secondary residual comprises: coding, using exponential Golomb coding with a prefix contexts and b suffix contexts, bits of a syntax element that specifies the value of the secondary residual minus N.

Clause 7A. The method of clause 6A, wherein N is 2.

Clause 8A. The method of clause 6A or 7A, wherein a is 5.

Clause 9A. The method of any of clauses 6A-8A, wherein b is 4.

Clause 1B. A method of processing a point cloud, the method comprising: coding, using variable length coding, a syntax element that represents a number of direct child nodes of a current predictive tree node present in a geometry predictive tree that represents the point cloud; and coding, using variable length coding, a syntax element that represents a mode used to predict a position associated with the current predictive tree node.

Clause 2B. The method of clause 1B, wherein the syntax element that represents the number of direct child nodes of the current predictive tree node present in the geometry predictive tree comprises a ptn_child_cnt syntax element.

Clause 3B. The method of clause 1B or 2B, wherein the syntax element that represents the mode used to predict the position associated with the current predictive tree node comprises a ptn_pred_mode syntax element.

Clause 1C. A method of processing a point cloud, the method comprising: responsive to determine that a single laser was used to capture light detection and ranging (LI-DAR) data that represents the point cloud, refraining from signaling a laser index value of the single laser.

Clause 1D. A method of processing a point cloud, the method comprising: performing zero prediction of the point cloud based: on an azimuth, a laser index of a parent neighbor, and a sign inference.

Clause 1E. A method of encoding a point cloud, the method comprising: obtaining a value of a secondary residual for geometry coding a current predictive tree node of the point cloud; and encoding the value of the secondary residual, wherein encoding the value comprises: encoding, using a first set of context-adaptive binary arithmetic coding (CABAC) contexts, prefix bins of a syntax element having a value that specifies an absolute value of the value of the secondary residual minus 2; and encoding, using a second set of CABAC contexts that is different than the first set of contexts, suffix bins of the syntax element.

Clause 2E. The method of clause 1E, wherein the syntax element comprises a ptn_sec_residual_abs_minus2 syntax element.

Clause 3E. The method of any of clauses 1E-2E, wherein the absolute value of the secondary residual is greater than 17, and wherein encoding the value of the secondary residual does not include encoding a syntax element that specifies the absolute value of the secondary residual minus 17.

Clause 4E. The method of any of clauses 1E-3E, wherein the first set of CABAC contexts comprises CABAC contexts having context indices between 0 and a−1, and wherein the second set of CABAC contexts comprises CABAC contexts having context indices between a and a+b−1.

Clause 5E. The method of clause 4E, wherein a is 5, and wherein b is 4.

Clause 6E. The method of any of clauses 1E-5E, wherein the syntax element comprises a first syntax element, and wherein encoding the value of the secondary residual further comprises: encoding a second syntax element having a value that specifies whether the value of the secondary residual is equal to zero; where the value of the secondary residual is not equal to zero: encoding a third syntax element having a value that specifies a sign of the value of the secondary residual; and encoding a fourth syntax element having a value that specifies whether the value of the secondary residual is greater than one; where the value of the secondary residual is greater than one, encoding the first syntax element.

Clause 7E. The method of any of clauses 1E-6E, wherein the current predictive tree node is a first predictive tree node, wherein the syntax element comprises a first syntax element, the method further comprising: obtaining a value of a phi multiplier for geometry coding a second predictive tree node of the point cloud; and encoding the value of the phi multiplier, wherein encoding the value of the phi multiplier comprises: encoding a fifth syntax element having a value that specifies an absolute value of the value of the phi multiplier minus 9.

Clause 8E. The method of clause 7E, wherein the absolute value of the phi multiplier is greater than 17, and wherein encoding the value of the phi multiplier does not include encoding a syntax element that specifies the value of the phi multiplier minus 17.

Clause 9E. The method of any of clauses 1E-8E, wherein the current predictive tree node is a first predictive tree node, and wherein the syntax element comprises a first syntax element, the method further comprising: encoding, using variable length coding, a sixth syntax element having a value that represents a number of direct child nodes of a second predictive tree node that are present in a geometry predictive tree that represents the point cloud.

Clause 10E. The method of clause 9E, wherein the sixth syntax element that represents the number of direct child nodes of the second predictive tree node present in the geometry predictive tree comprises a ptn_child_cnt syntax element.

Clause 11E. The method of clause 9E, wherein encoding the sixth syntax element using variable length coding comprises utilizing a shorter codeword where the number of direct child nodes is 1 than where the number of direct child nodes is 0.

Clause 12E. A method of decoding a point cloud, the method comprising: obtaining a value of a secondary residual for geometry coding a current predictive tree node of the point cloud; and decoding the value of the secondary residual, wherein encoding the value comprises: decoding, using a first set of context-adaptive binary arithmetic coding (CABAC) contexts, prefix bins of a syntax element having a value that specifies an absolute value of the value of the secondary residual minus 2; and decoding, using a second set of CABAC contexts that is different than the first set of contexts, suffix bins of the syntax element.

Clause 13E. The method of clause 12E, wherein the syntax element comprises a ptn_sec_residual_abs_minus2 syntax element.

Clause 14E. The method of any of clauses 12E-13E, wherein the absolute value of the secondary residual is greater than 17, and wherein decoding the value of the secondary residual does not include decoding a syntax element that specifies the absolute value of the secondary residual minus 17.

Clause 15E. The method of any of clauses 12E-14E, wherein the first set of CABAC contexts comprises CABAC contexts having context indices between 0 and a−1, and wherein the second set of CABAC contexts comprises CABAC contexts having context indices between a and a+b−1.

Clause 16E. The method of clause 15E, wherein a is 5, and wherein b is 4.

Clause 17E. The method of any of clauses 12E-16E, wherein the syntax element comprises a first syntax element, and wherein decoding the value of the secondary residual further comprises: decoding a second syntax element having a value that specifies whether the value of the secondary residual is equal to zero; where the value of the secondary residual is not equal to zero: decoding a third syntax element having a value that specifies a sign of the value of the secondary residual; and decoding a fourth syntax element having a value that specifies whether the value of the secondary residual is greater than one; where the value of the secondary residual is greater than one, decoding the first syntax element.

Clause 18E. The method of any of clauses 12E-17E, wherein the current predictive tree node is a first predictive tree node, wherein the syntax element comprises a first syntax element, the method further comprising: obtaining a value of a phi multiplier for geometry coding a second predictive tree node of the point cloud; and decoding the value of the phi multiplier, wherein decoding the value of the phi multiplier comprises: decoding a fifth syntax element having a value that specifies an absolute value of the value of the phi multiplier minus 9.

Clause 19E. The method of clause 18E, wherein the absolute value of the phi multiplier is greater than 17, and wherein decoding the value of the phi multiplier does not include decoding a syntax element that specifies the value of the phi multiplier minus 17.

Clause 20E. The method of any of clauses 12E-19E, wherein the current predictive tree node is a first predictive tree node, wherein the syntax element comprises a first syntax element, the method further comprising: decoding, using variable length coding, a sixth syntax element having a value that represents a number of direct child nodes of a second predictive tree node that are present in a geometry predictive tree that represents the point cloud.

Clause 21E. The method of clause 20E, wherein the sixth syntax element that represents the number of direct child nodes of the second predictive tree node present in the geometry predictive tree comprises a ptn_child_cnt syntax element.

Clause 22E. The method of clause 20E, wherein decoding the sixth syntax element using variable length coding comprises utilizing a shorter codeword where the number of direct child nodes is 1 than where the number of direct child nodes is 0.

Clause 23E. A device for encoding a point cloud, the device comprising: a memory configured to store at least a portion of the point cloud; and one or more processors implemented in circuitry and configured to: obtain a value of a secondary residual for geometry coding a current predictive tree node of the point cloud; and encode the value of the secondary residual, wherein, to encode the value, the one or more processors are configured to: encode, using a first set of context-adaptive binary arithmetic coding (CABAC) contexts, prefix bins of a syntax element having a value that specifies an absolute value of the value of the secondary residual minus 2; and encode, using a second set of CABAC contexts that is different than the first set of contexts, suffix bins of the syntax element.

Clause 24E. The device of clause 23E, wherein the syntax element comprises a ptn_sec_residual_abs_minus2 syntax element.

Clause 25E. The device of any of clauses 23E-24E, wherein the absolute value of the secondary residual is greater than 17, and wherein, to encode the value of the secondary residual, the one or more processors are not configured to encode a syntax element that specifies the absolute value of the secondary residual minus 17.

Clause 26E. The device of any of clauses 23E-25E, wherein the first set of CABAC contexts comprises CABAC contexts having context indices between 0 and a−1, and wherein the second set of CABAC contexts comprises CABAC contexts having context indices between a and a+b−1.

Clause 27E. The device of clause 26E, wherein a is 5, and wherein b is 4.

Clause 28E. The device of any of clauses 23E-27E, wherein the syntax element comprises a first syntax element, and wherein, to encode the value of the secondary residual further, the one or more processors are configured to: encode a second syntax element having a value that specifies whether the value of the secondary residual is equal to zero; where the value of the secondary residual is riot equal to zero: encode a third syntax element having a value that specifies a sign of the value of the secondary residual; and encode a fourth syntax element having a value that specifies whether the value of the secondary residual is greater than one; where the value of the secondary residual is greater than one, encode the first syntax element.

Clause 29E. The device of any of clauses 23E-29E, wherein the current predictive tree node is a first predictive tree node, wherein the syntax element comprises a first syntax element, and wherein the one or more processors are further configured to: obtain a value of a phi multiplier for geometry coding a second predictive tree node of the point cloud; and encode the value of the phi multiplier, wherein, to encode the value of the phi multiplier, the one or more processors are configured to: encode a fifth syntax element having a value that specifies an absolute value of the value of the phi multiplier minus 9.

Clause 30E. The device of clause 29E, wherein the absolute value of the phi multiplier is greater than 17, and wherein, to encode the value of the phi multiplier, the one or more processors are not configured to encode a syntax element that specifies the value of the phi multiplier minus 17.

Clause 31E. The device of any of clauses 23E-30E, wherein the current predictive tree node is a first predictive tree node, wherein the syntax element comprises a first syntax element, and wherein the one or more processors are further configured to: encode, using variable length coding, a sixth syntax element having a value that represents a number of direct child nodes of a second predictive tree node that are present in a geometry predictive tree that represents the point cloud.

Clause 32E. The device of clause 31E, wherein the sixth syntax element that represents the number of direct child nodes of the second predictive tree node present in the geometry predictive tree comprises a ptn_child_cnt syntax element.

Clause 33E. The device of clause 31E, wherein, to encode the sixth syntax element using variable length coding, the one or more processors are configured to utilize a shorter codeword where the number of direct child nodes is 1 than where the number of direct child nodes is 0.

Clause 34E. A device for decoding a point cloud, the device comprising: a memory configured to store at least a portion of the point cloud; and one or more processors implemented in circuitry and configured to: obtain a value of a secondary residual for geometry coding a current predictive tree node of the point cloud; and decode the value of the secondary residual, wherein, to decode the value, the one or more processors are configured to: decode, using a first set of context-adaptive binary arithmetic coding (CABAC) contexts, prefix bins of a syntax element having a value that specifies an absolute value of the value of the secondary residual minus 2; and decode, using a second set of CABAC contexts that is different than the first set of contexts, suffix bins of the syntax element.

Clause 35E. The device of clause 34E, wherein the syntax element comprises a ptn_sec_residual_abs_minus2 syntax element.

Clause 36E. The device of any of clauses 34E-35E, wherein the absolute value of the secondary residual is greater than 17, and wherein, to decode the value of the secondary residual, the one or more processors are not configured to decode a syntax element that specifies the absolute value of the secondary residual minus 17.

Clause 37E. The device of any of clauses 34E-36E, wherein the first set of CABAC contexts comprises CABAC contexts having context indices between 0 and a−1, and wherein the second set of CABAC contexts comprises CABAC contexts having context indices between a and a+b−1.

Clause 38E. The device of clause 37E, wherein a is 5, and wherein b is 4.

Clause 39E. The device of any of clauses 34E-38E, wherein the syntax element comprises a first syntax element, and wherein, to decode the value of the secondary residual further, the one or more processors are configured to: decode a second syntax element having a value that specifies whether the value of the secondary residual is equal to zero; where the value of the secondary residual is not equal to zero: decode a third syntax element having a value that specifies a sign of the value of the secondary residual; and decode a fourth syntax element having a value that specifies whether the value of the secondary residual is greater than one; where the value of the secondary residual is greater than one, decode the first syntax element.

Clause 40E. The device of any of clauses 34E-39E, wherein the current predictive tree node is a first predictive tree node, wherein the syntax element comprises a first syntax element, and wherein the one or more processors are further configured to: obtain a value of a phi multiplier for geometry coding a second predictive tree node of the point cloud; and decode the value of the phi multiplier, wherein, to decode the value of the phi multiplier, the one or more processors are configured to: decode a fifth syntax element having a value that specifies an absolute value of the value of the phi multiplier minus 9.

Clause 41E. The device of any of clauses 34E-40E, wherein the absolute value of the phi multiplier is greater than 17, and wherein, to decode the value of the phi multiplier, the one or more processors are not configured to decode a syntax element that specifies the value of the phi multiplier minus 17.

Clause 42E. The device of any of clauses 34E-41E, wherein the current predictive tree node is a first predictive tree node, wherein the syntax element comprises a first syntax element, and wherein the one or more processors are further configured to: decode, using variable length coding, a sixth syntax element having a value that represents a number of direct child nodes of a second predictive tree node that are present in a geometry predictive tree that represents the point cloud.

Clause 43E. The device of clause 42E, wherein the sixth syntax element that represents the number of direct child nodes of the second predictive tree node present in the geometry predictive tree comprises a ptn_child_cnt syntax element.

Clause 44E. The device of clause 42E, wherein, to decode the sixth syntax element using variable length coding, the one or more processors are configured to utilize a shorter codeword where the number of direct child nodes is 1 than where the number of direct child nodes is 0.

Clause 45E. A computer-readable storage medium storing instructions that, when executed, cause one or more processors of a point cloud encoder to: obtain a value of a secondary residual for geometry coding a current predictive tree node of the point cloud and encode the value of the secondary residual, wherein, the instructions that cause the one or more processors to encode the value comprise instructions that cause the one or more processors to: encode, using a first set of context-adaptive binary arithmetic coding (CABAC) contexts, prefix bins of a syntax element having a value that specifies an absolute value of the value of the secondary residual minus 2; and encode, using a second set of CABAC contexts that is different than the first set of contexts, suffix bins of the syntax element.

Clause 46E. A computer-readable storage medium storing instructions that, when executed, cause one or more processors of a point cloud decoder to: obtain a value of a secondary residual for geometry coding a current predictive tree node of the point cloud; and decode the value of the secondary residual, wherein, the instructions that cause the one or more processors to decode the value comprise instructions that cause the one or more processors to: decode, using a first set of context-adaptive binary arithmetic coding (CABAC) contexts, prefix bins of a syntax element having a value that specifies an absolute value of the value of the secondary residual minus 2; and decode, using a second set of CABAL contexts that is different than the first set of contexts, suffix bins of the syntax element.

Clause 1F. A method of decoding a point cloud, the method comprising: selecting, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determining a radius, an azimuth, and a laser index of a parent node of the current predictive tree node; inferring an azimuth and a laser index of a predicted position of the current predictive tree node as the azimuth and the laser index of the parent node; inferring a radius of the predicted position to be a minimum radius value, wherein the minimum radius value is different than the radius of the parent node; and determining, based on the predicted position of the current predictive tree node, the position of the current predictive tree node.

Clause 2F. The method of clause 1F, further comprising: responsive to selecting the delta prediction mode: inferring the radius, the azimuth, and the laser index of the predicted position of the current predictive tree node as the radius, the azimuth, and the laser index of the parent node.

Clause 3F. The method of any of clauses 1F-2F, wherein the minimum radius value is zero.

Clause 4F. The method of any of clauses 1F-3F, wherein the minimum radius value is greater than zero.

Clause 5F. The method of any of clauses 1F-4F, wherein determining the position of the current node based on the predicted position comprises: obtaining a residual radius value that represents a difference between a value of the radius of the predicted position of the current predictive tree node and a value of the radius of the position of the current predictive tree node.

Clause 6F. The method of clause 5F, wherein obtaining the residual radius value comprises: responsive to selecting the zero prediction mode, inferring a sign of the residual radius value to be positive.

Clause 7F. The method of any of clauses 1F-6F, further comprising: determining a quantity of lasers used to capture light detection and ranging (LIDAR) data that represents the point cloud; and responsive to determining that the quantity of lasers is one, inferring laser indices for all nodes in the point cloud to be a same value.

Clause 8F. The method of any of clauses 1F-7F, wherein selecting the prediction mode comprises: decoding a syntax element having a value that indicates the selected prediction mode.

Clause 9F. A method of encoding a point cloud, the method comprising: selecting, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected mode is the zero prediction mode: determining a radius, an azimuth, and a laser index of a parent node of the current predictive tree node; inferring an azimuth and a laser index of a predicted position of the current predictive tree node as the azimuth and the laser index of the parent node; inferring a radius of the predicted position to be a minimum radius value, wherein the minimum radius value is different than the radius of the parent node; and determining, based on the predicted position of the current predictive tree node, the position of the current predictive tree node.

Clause 10F. The method of clause 9F, thriller comprising: responsive to selecting the delta prediction mode: inferring the radius, the azimuth, and the laser index of the predicted position of the current predictive tree node as the radius, the azimuth, and the laser index of the parent node.

Clause 11F. The method of any of clauses 9F-10F, wherein the minimum radius value is zero.

Clause 12F. The method of any of clauses 9F-11F, wherein the minimum radius value is greater than zero.

Clause 13F. The method of any of clauses 9F-12F, wherein determining the position of the current node based on the predicted position comprises: obtaining a residual radius value that represents a difference between a value of the radius of the predicted position of the current predictive tree node and a value of the radius of the position of the current predictive tree node.

Clause 14F. The method of clause 13F, wherein obtaining the residual radius value comprises: where the selected mode is the zero prediction mode, inferring a sign of the residual radius value to be positive.

Clause 15F. The method of any of clauses 9F-14F, thither comprising: determining a quantity of lasers used to capture light detection and ranging (LIDAR) data that represents the point cloud; and responsive to determining that the quantity of lasers is one, inferring laser indices for all nodes in the point cloud to be a same value.

Clause 16F. The method of any of clauses 9F-15F, wherein selecting the prediction mode comprises: encoding a syntax element having a value that indicates the selected prediction mode.

Clause 17F. A device for decoding a point cloud, the device comprising: a memory configured to store at least a portion of the point cloud; and one or more processors implemented in circuitry and configured to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

Clause 18F. The device of clause 17F, wherein the one or more processors are further configured to: responsive to selecting the delta prediction mode: infer the radius, the azimuth, and the laser index of the predicted position of the current predictive tree node as the radius, the azimuth, and the laser index of the parent node.

Clause 19F. The device of any of clauses 17F-18F, wherein the minimum radius value is zero.

Clause 20F. The device of any of clauses 17F-19F, wherein the minimum radius value is greater than zero.

Clause 21F. The device of any of clauses 17F-20F, wherein, to determine the position of the current node based on the predicted position, the one or more processors are configured to: obtain a residual radius value that represents a difference between a value of the radius of the predicted position of the current predictive tree node and a value of the radius of the position of the current predictive tree node.

Clause 22F. The device of clause 21F, wherein, to obtain the residual radius value, the one or more processors are configured to: infer, responsive to selecting the zero prediction mode, a sign of the residual radius value to be positive.

Clause 23F. The device of any of clauses 17F-22F, wherein the one or more processors are further configured to: determine a quantity of lasers used to capture light detection and ranging (LIDAR) data that represents the point cloud; and infer, responsive to determining that the quantity of lasers is one, laser indices for all nodes in the point cloud to be a same value.

Clause 24F. The device of any of clauses 17F-23F, wherein, to select the prediction mode, the one or more processors are further configured to: decode a syntax element having a value that indicates the selected prediction mode.

Clause 25F. A device for encoding a point cloud, the device comprising: a memory configured to store at least a portion of the point cloud; and one or more processors implemented in circuitry and configured to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected mode is the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

Clause 26F. The device of clause 25F, wherein the one or more processors are further configured to: responsive to selecting the delta prediction mode: infer the radius, the azimuth, and the laser index of the predicted position of the current predictive tree node as the radius, the azimuth, and the laser index of the parent node.

Clause 27F. The device of any of clauses 25F-26F, wherein the minimum radius value is zero.

Clause 28F. The device of any of clauses 25F-27F, wherein the minimum radius value is greater than zero.

Clause 29F. The device of any of clauses 25F-28F, wherein, to determine the position of the current node based on the predicted position, the one or more processors are configured to: obtain a residual radius value that represents a difference between a value of the radius of the predicted position of the current predictive tree node and a value of the radius of the position of the current predictive tree node.

Clause 30F. The device of clause 29F, wherein, to obtain the residual radius value, the one or more processors are configured to: infer, responsive to selecting the zero prediction mode, a sign of the residual radius value to be positive.

Clause 31F. The device of any of clauses 25F-30F, wherein the one or more processors are further configured to: determine a quantity of lasers used to capture light detection and ranging (LIDAR) data that represents the point cloud; and infer, responsive to determining that the quantity of lasers is one, laser indices for all nodes in the point cloud to be a same value.

Clause 32F. The device of any of clauses 25F-31F, wherein, to select the prediction mode, the one or more processors are further configured to: encode a syntax element having a value that indicates the selected prediction mode.

Clause 33F. A computer-readable storage medium storing instructions that, when executed, cause one or more processors of a point cloud decoding device to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; responsive to selecting the zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node, and determine, based on the predicted position of the current predictive tree node, the position of the current predictive tree node.

Clause 34F. A computer-readable storage medium storing instructions that, when executed, cause one or more processors of a point cloud encoding device to: select, from a plurality of predefined prediction modes, a prediction mode for performing predictive geometry coding of a position of a current predictive tree node of the point cloud, wherein the plurality of prediction modes includes at least: a zero prediction mode, and a delta prediction mode; where the selected prediction mode is zero prediction mode: determine a radius, an azimuth, and a laser index of a parent node of the current predictive tree node; infer an azimuth and a laser index of a predicted position of the current predictive tree node as the azimuth and the laser index of the parent node; infer a radius of the predicted position to be a minimum radius value, wherein the minimum radius value is different than the radius of the parent node; and determine, based on the predicted position of the current predictive tree node, the position of the current predictive tree node.

Clause 1Z. A device for processing a point cloud, the device comprising one or more means for performing the method of any of clauses 1A-1F.

Clause 2Z. The device of clause 1Z, wherein the one or more means comprise one or more processors implemented in circuitry.

Clause 3Z. The device of any of clauses 1Z or 2Z, further comprising a memory to store the data representing the point cloud.

Clause 4Z. The device of any of clauses 1Z-3Z, wherein the device comprises a decoder.

Clause 5Z. The device of any of clauses 1Z-4Z, wherein the device comprises an encoder.

Clause 6Z. The device of any of clauses 1Z-5Z, further comprising a device to generate the point cloud.

Clause 7Z. The device of any of clauses 1Z-6Z, further comprising a display to present imagery based on the point cloud.

Clause 8Z. A computer-readable storage medium having stored thereon instructions that, when executed, cause one or more processors to perform the method of any of clauses 1A-1F.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding a point cloud, the method comprising:
obtaining a value of a secondary residual for geometry coding a current predictive tree node of the point cloud; and
encoding the value of the secondary residual, wherein encoding the value comprises:
encoding, using a first set of context-adaptive binary arithmetic coding (CABAC) contexts, prefix bins of a syntax element, the syntax element having a value that specifies an absolute value of the value of the secondary residual; and
encoding, using a second set of CABAC contexts that is different than the first set of contexts, suffix bins of the syntax element.

2. The method of claim 1, wherein the syntax element comprises a ptn_sec_residual_abs_minus2 syntax element.

3. The method of claim 1, wherein the absolute value of the secondary residual is greater than 17, and wherein encoding the value of the secondary residual does not include encoding a syntax element that specifies the absolute value of the secondary residual minus 17.

4. The method of claim 1, wherein the first set of CABAC contexts comprises CABAC contexts having context indices between 0 and a−1, and wherein the second set of CABAC contexts comprises CABAC contexts having context indices between a and a+b−1.

5. The method of claim 4, wherein a is 5, and wherein b is 4.

6. The method of claim 1, wherein the syntax element comprises a first syntax element, and wherein encoding the value of the secondary residual further comprises:
  encoding a second syntax element having a value that specifies whether the value of the secondary residual is equal to zero;
  where the value of the secondary residual is not equal to zero:
    encoding a third syntax element having a value that specifies a sign of the value of the secondary residual; and
    encoding a fourth syntax element having a value that specifies whether the value of the secondary residual is greater than one;
  where the value of the secondary residual is greater than one, encoding the first syntax element.

7. The method of claim 1, wherein the current predictive tree node is a first predictive tree node, wherein the syntax element comprises a first syntax element, the method further comprising:
  obtaining a value of a phi multiplier for geometry coding a second predictive tree node of the point cloud; and
  encoding the value of the phi multiplier, wherein encoding the value of the phi multiplier comprises:
    encoding a fifth syntax element having a value that specifies an absolute value of the value of the phi multiplier minus 9.

8. The method of claim 7, wherein the absolute value of the phi multiplier is greater than 17, and wherein encoding the value of the phi multiplier does not include encoding a syntax element that specifies the value of the phi multiplier minus 17.

9. The method of claim 1, wherein the current predictive tree node is a first predictive tree node, and wherein the syntax element comprises a first syntax element, the method further comprising:
  encoding, using variable length coding, a sixth syntax element having a value that represents a number of direct child nodes of a second predictive tree node that are present in a geometry predictive tree that represents the point cloud.

10. The method of claim 9, wherein the sixth syntax element that represents the number of direct child nodes of the second predictive tree node present in the geometry predictive tree comprises a ptn_child_cnt syntax element.

11. The method of claim 9, wherein encoding the sixth syntax element using variable length coding comprises utilizing a shorter codeword where the number of direct child nodes is 1 than where the number of direct child nodes is 0.

12. A method of decoding a point cloud, the method comprising:
  obtaining a value of a secondary residual for geometry coding a current predictive tree node of the point cloud; and
  decoding the value of the secondary residual, wherein encoding the value comprises:
    decoding, using a first set of context-adaptive binary arithmetic coding (CABAC) contexts, prefix bins of a syntax element, the syntax element having a value that specifies an absolute value of the value of the secondary residual; and
    decoding, using a second set of CABAC contexts that is different than the first set of contexts, suffix bins of the syntax element.

13. The method of claim 12, wherein the syntax element comprises a ptn_sec_residual_abs_minus2 syntax element.

14. The method of claim 12, wherein the absolute value of the secondary residual is greater than 17, and wherein decoding the value of the secondary residual does not include decoding a syntax element that specifies the absolute value of the secondary residual minus 17.

15. The method of claim 12, wherein the first set of CABAC contexts comprises CABAC contexts having context indices between 0 and a−1, and wherein the second set of CABAC contexts comprises CABAC contexts having context indices between a and a+b−1.

16. The method of claim 15, wherein a is 5, and wherein b is 4.

17. The method of claim 12, wherein the syntax element comprises a first syntax element, and wherein decoding the value of the secondary residual further comprises:
  decoding a second syntax element having a value that specifies whether the value of the secondary residual is equal to zero;
  where the value of the secondary residual is not equal to zero:
    decoding a third syntax element having a value that specifies a sign of the value of the secondary residual; and
    decoding a fourth syntax element having a value that specifies whether the value of the secondary residual is greater than one;
  where the value of the secondary residual is greater than one, decoding the first syntax element.

18. The method of claim 12, wherein the current predictive tree node is a first predictive tree node, wherein the syntax element comprises a first syntax element, the method further comprising:
  obtaining a value of a phi multiplier for geometry coding a second predictive tree node of the point cloud; and
  decoding the value of the phi multiplier, wherein decoding the value of the phi multiplier comprises:
    decoding a fifth syntax element having a value that specifies an absolute value of the value of the phi multiplier minus 9.

19. The method of claim 18, wherein the absolute value of the phi multiplier is greater than 17, and wherein decoding the value of the phi multiplier does not include decoding a syntax element that specifies the value of the phi multiplier minus 17.

20. The method of claim 12, wherein the current predictive tree node is a first predictive tree node, wherein the syntax element comprises a first syntax element, the method further comprising:
  decoding, using variable length coding, a sixth syntax element having a value that represents a number of direct child nodes of a second predictive tree node that are present in a geometry predictive tree that represents the point cloud.

21. The method of claim 20, wherein the sixth syntax element that represents the number of direct child nodes of the second predictive tree node present in the geometry predictive tree comprises a ptn_child_cnt syntax element.

22. The method of claim 20, wherein decoding the sixth syntax element using variable length coding comprises utilizing a shorter codeword where the number of direct child nodes is 1 than where the number of direct child nodes is 0.

23. A device for encoding a point cloud, the device comprising:
a memory configured to store at least a portion of the point cloud; and
one or more processors implemented in circuitry and configured to:
obtain a value of a secondary residual for geometry coding a current predictive tree node of the point cloud; and
encode the value of the secondary residual, wherein, to encode the value, the one or more processors are configured to:
encode, using a first set of context-adaptive binary arithmetic coding (CABAC) contexts, prefix bins of a syntax element, the syntax element having a value that specifies an absolute value of the value of the secondary residual; and
encode, using a second set of CABAC contexts that is different than the first set of contexts, suffix bins of the syntax element.

24. The device of claim 23, wherein the syntax element comprises a ptn_sec_residual_abs_minus2 syntax element.

25. The device of claim 23, wherein the absolute value of the secondary residual is greater than 17, and wherein, to encode the value of the secondary residual, the one or more processors are not configured to encode a syntax element that specifies the absolute value of the secondary residual minus 17.

26. The device of claim 23, wherein the first set of CABAC contexts comprises CABAC contexts having context indices between 0 and a−1, and wherein the second set of CABAC contexts comprises CABAC contexts having context indices between a and a+b−1.

27. The device of claim 26, wherein a is 5, and wherein b is 4.

28. The device of claim 23, wherein the syntax element comprises a first syntax element, and wherein, to encode the value of the secondary residual further, the one or more processors are configured to:
encode a second syntax element having a value that specifies whether the value of the secondary residual is equal to zero;
where the value of the secondary residual is not equal to zero:
encode a third syntax element having a value that specifies a sign of the value of the secondary residual; and
encode a fourth syntax element having a value that specifies whether the value of the secondary residual is greater than one;
where the value of the secondary residual is greater than one, encode the first syntax element.

29. The device of claim 23, wherein the current predictive tree node is a first predictive tree node, wherein the syntax element comprises a first syntax element, and wherein the one or more processors are further configured to:
obtain a value of a phi multiplier for geometry coding a second predictive tree node of the point cloud; and
encode the value of the phi multiplier, wherein, to encode the value of the phi multiplier, the one or more processors are configured to:
encode a fifth syntax element having a value that specifies an absolute value of the value of the phi multiplier minus 9.

30. The device of claim 29, wherein the absolute value of the phi multiplier is greater than 17, and wherein, to encode the value of the phi multiplier, the one or more processors are not configured to encode a syntax element that specifies the value of the phi multiplier minus 17.

31. The device of claim 23, wherein the current predictive tree node is a first predictive tree node, wherein the syntax element comprises a first syntax element, and wherein the one or more processors are further configured to:
encode, using variable length coding, a sixth syntax element having a value that represents a number of direct child nodes of a second predictive tree node that are present in a geometry predictive tree that represents the point cloud.

32. The device of claim 31, wherein the sixth syntax element that represents the number of direct child nodes of the second predictive tree node present in the geometry predictive tree comprises a ptn_child_cnt syntax element.

33. The device of claim 31, wherein, to encode the sixth syntax element using variable length coding, the one or more processors are configured to utilize a shorter codeword where the number of direct child nodes is 1 than where the number of direct child nodes is 0.

34. A device for decoding a point cloud, the device comprising:
a memory configured to store at least a portion of the point cloud; and
one or more processors implemented in circuitry and configured to:
obtain a value of a secondary residual for geometry coding a current predictive tree node of the point cloud; and
decode the value of the secondary residual, wherein, to decode the value, the one or more processors are configured to:
decode, using a first set of context-adaptive binary arithmetic coding (CABAC) contexts, prefix bins of a syntax element, the syntax element having a value that specifies an absolute value of the value of the secondary residual; and
decode, using a second set of CABAC contexts that is different than the first set of contexts, suffix bins of the syntax element.

35. The device of claim 34, wherein the syntax element comprises a ptn_sec_residual_abs_minus2 syntax element.

36. The device of claim 34, wherein the absolute value of the secondary residual is greater than 17, and wherein, to decode the value of the secondary residual, the one or more processors are not configured to decode a syntax element that specifies the absolute value of the secondary residual minus 17.

37. The device of claim 34, wherein the first set of CABAC contexts comprises CABAC contexts having context indices between 0 and a−1, and wherein the second set of CABAC contexts comprises CABAC contexts having context indices between a and a+b−1.

38. The device of claim 37, wherein a is 5, and wherein b is 4.

39. The device of claim 34, wherein the syntax element comprises a first syntax element, and wherein, to decode the value of the secondary residual further, the one or more processors are configured to:
  decode a second syntax element having a value that specifies whether the value of the secondary residual is equal to zero;
  where the value of the secondary residual is not equal to zero:
    decode a third syntax element having a value that specifies a sign of the value of the secondary residual; and
    decode a fourth syntax element having a value that specifies whether the value of the secondary residual is greater than one;
  where the value of the secondary residual is greater than one, decode the first syntax element.

40. The device of claim 34, wherein the current predictive tree node is a first predictive tree node, wherein the syntax element comprises a first syntax element, and wherein the one or more processors are further configured to:
  obtain a value of a phi multiplier for geometry coding a second predictive tree node of the point cloud; and
  decode the value of the phi multiplier, wherein, to decode the value of the phi multiplier, the one or more processors are configured to:
    decode a fifth syntax element having a value that specifies an absolute value of the value of the phi multiplier minus 9.

41. The device of claim 40, wherein the absolute value of the phi multiplier is greater than 17, and wherein, to decode the value of the phi multiplier, the one or more processors are not configured to decode a syntax element that specifies the value of the phi multiplier minus 17.

42. The device of claim 34, wherein the current predictive tree node is a first predictive tree node, wherein the syntax element comprises a first syntax element, and wherein the one or more processors are further configured to:
  decode, using variable length coding, a sixth syntax element having a value that represents a number of direct child nodes of a second predictive tree node that are present in a geometry predictive tree that represents the point cloud.

43. The device of claim 42, wherein the sixth syntax element that represents the number of direct child nodes of the second predictive tree node present in the geometry predictive tree comprises a ptn_child_cnt_syntax element.

44. The device of claim 42, wherein, to decode the sixth syntax element using variable length coding, the one or more processors are configured to utilize a shorter codeword where the number of direct child nodes is 1 than where the number of direct child nodes is 0.

45. A computer-readable storage medium storing instructions that, when executed, cause one or more processors of a point cloud encoder to:
  obtain a value of a secondary residual for geometry coding a current predictive tree node of the point cloud; and
  encode the value of the secondary residual, wherein, the instructions that cause the or more processors to encode the value comprise instructions that cause the one or more processors to:
    encode, using a first set of context-adaptive binary arithmetic coding (CABAC) contexts, prefix bins of a syntax element, the syntax element having a value that specifies an absolute value of the value of the secondary residual; and
    encode, using a second set of CABAC contexts that is different than the first set of contexts, suffix bins of the syntax element.

46. A computer-readable storage medium storing instructions that, when executed, cause one or more processors of a point cloud decoder to:
  obtain a value of a secondary residual for geometry coding a current predictive tree node of the point cloud; and
  decode the value of the secondary residual, wherein, the instructions that cause the or more processors to decode the value comprise instructions that cause the one or more processors to:
    decode, using a first set of context-adaptive binary arithmetic coding (CABAC) contexts, prefix bins of a syntax element, the syntax element having a value that specifies an absolute value of the value of the secondary residual; and
    decode, using a second set of CABAC contexts that is different than the first set of contexts, suffix bins of the syntax element.

\* \* \* \* \*